US011150385B2

(12) United States Patent
Yamashita

(10) Patent No.: US 11,150,385 B2
(45) Date of Patent: Oct. 19, 2021

(54) OPTICAL SYSTEM, OPTICAL DEVICE COMPRISING OPTICAL SYSTEM, AND METHOD FOR MANUFACTURING OPTICAL SYSTEM

(71) Applicant: Nikon Corporation, Tokyo (JP)

(72) Inventor: Masashi Yamashita, Tokyo (JP)

(73) Assignee: Nikon Corporation, Tokyo (JP)

( * ) Notice: Subject to any disclaimer, the term of this patent is extended or adjusted under 35 U.S.C. 154(b) by 5 days.

(21) Appl. No.: 15/544,407

(22) PCT Filed: Jan. 21, 2016

(86) PCT No.: PCT/JP2016/051724
§ 371 (c)(1),
(2) Date: Sep. 21, 2017

(87) PCT Pub. No.: WO2016/117652
PCT Pub. Date: Jul. 28, 2016

(65) Prior Publication Data
US 2018/0196168 A1    Jul. 12, 2018

(30) Foreign Application Priority Data

Jan. 23, 2015    (JP) .............................. JP2015-011654

(51) Int. Cl.
*G02B 15/14*    (2006.01)
*G02B 13/18*    (2006.01)
(Continued)

(52) U.S. Cl.
CPC ................ *G02B 1/111* (2013.01); *G02B 9/06* (2013.01); *G02B 9/34* (2013.01); *G02B 9/64* (2013.01);
(Continued)

(58) Field of Classification Search
CPC ... G02B 9/00; G02B 9/12; G02B 9/14; G02B 13/00; G02B 13/001; G02B 13/0035; G02B 15/00; G02B 15/22; G02B 15/28
(Continued)

(56) References Cited

U.S. PATENT DOCUMENTS 4,176,913 A    12/1979 Nakamura et al.
4,852,984 A *    8/1989 Takahashi .............. G02B 13/02
            359/748
(Continued)

FOREIGN PATENT DOCUMENTS

CN    1989427 A    6/2007
CN    102789042 A    11/2012
(Continued)

OTHER PUBLICATIONS

Extended European Search Report dated Nov. 30, 2018, in European Patent Application No. 16740259.3.
(Continued)

*Primary Examiner* — Thong Q Nguyen
(74) *Attorney, Agent, or Firm* — SGPatents PLLC

(57) ABSTRACT

An optical system includes, disposed in sequence starting on an object side along an optical axis: a first lens group having a positive refractive power; a second lens group having a negative refractive power; and a third lens group having a positive refractive power, wherein: the second lens group moves along the optical axis upon focusing from an infinity-distance object to a short-distance object; and a following conditional expression is satisfied: $1.00 < f/(-f2) < 2.40$ where: f: a focal length of the optical system in an infinity in-focus state; and f2: a focal length of the second lens group.

36 Claims, 18 Drawing Sheets

(51) Int. Cl.
  *G02B 1/111* (2015.01)
  *G02B 13/00* (2006.01)
  *G02B 13/02* (2006.01)
  *G02B 9/06* (2006.01)
  *G02B 9/34* (2006.01)
  *G02B 9/64* (2006.01)

(52) U.S. Cl.
  CPC ............. *G02B 13/00* (2013.01); *G02B 13/02* (2013.01); *G02B 13/18* (2013.01)

(58) Field of Classification Search
  USPC ....... 359/676, 679, 680, 682, 684, 689, 690, 359/745, 748, 749, 753–754, 784–788
  See application file for complete search history.

(56) References Cited

U.S. PATENT DOCUMENTS

| | | | |
|---|---|---|---|
| 6,115,188 A | | 9/2000 | Nishio et al. |
| 6,384,975 B1* | | 5/2002 | Hayakawa ........... G02B 27/646 359/557 |
| 6,421,189 B1* | | 7/2002 | Sensui .................. G02B 13/02 359/746 |
| 6,580,568 B2* | | 6/2003 | Ozaki ...................... G02B 9/14 359/745 |
| 6,728,033 B2* | | 4/2004 | Hayakawa ........... G02B 27/646 359/557 |
| 8,643,960 B2* | | 2/2014 | Hayashi ................ G02B 13/02 359/684 |
| 2002/0041452 A1* | | 4/2002 | Ozaki .................... G02B 13/02 359/745 |
| 2002/0075570 A1* | | 6/2002 | Yamakawa ............. G02B 7/04 359/684 |
| 2005/0248857 A1 | | 11/2005 | Wada |
| 2008/0002259 A1 | | 1/2008 | Ishizawa et al. |
| 2009/0262439 A1* | | 10/2009 | Yoneyama ............. G02B 13/02 359/748 |
| 2011/0080654 A1 | | 4/2011 | Okumura |
| 2012/0050872 A1* | | 3/2012 | Ito ........................... G02B 7/08 359/601 |
| 2014/0104708 A1* | | 4/2014 | Onozaki ................. G02B 9/20 359/745 |
| 2014/0176782 A1* | | 6/2014 | Yokoyama .............. G02B 9/14 348/345 |
| 2014/0300804 A1 | | 10/2014 | Ryu |
| 2015/0370044 A1* | | 12/2015 | Yamada ............... G02B 15/173 348/335 |
| 2015/0378137 A1* | | 12/2015 | Obikane ................ G02B 13/24 359/745 |

FOREIGN PATENT DOCUMENTS

| | | | |
|---|---|---|---|
| JP | 53-134425 | A | 11/1978 |
| JP | 07-325272 | A | 12/1995 |
| JP | 11-119092 | A | 4/1999 |
| JP | 2003-043348 | A | 2/2003 |
| JP | 2005-321574 | A | 11/2005 |
| JP | 2008-145584 | A | 6/2008 |
| JP | 2011-081064 | A | 4/2011 |
| JP | 2013-033178 | A | 2/2013 |
| JP | 2013-161076 | A | 8/2013 |
| JP | 2013-246354 | A | 12/2013 |
| JP | 2014-123018 | A | 7/2014 |
| JP | 2016-136213 | A | 7/2016 |
| WO | WO 2006/030848 | A1 | 3/2006 |

OTHER PUBLICATIONS

Partial European Search Report dated Aug. 30, 2018, in European Patent Application No. 16740259.3.
English Translation of International Search Report from International Patent Application No. PCT/JP2016/051724, dated Mar. 29, 2016.
English translation of International Preliminary Report on Patentability from International Patent Application No. PCT/JP2016/051724, dated Jul. 25, 2017.
Office Action dated Jan. 28, 2019, in Chinese Patent Application No. 201680011705.0.
Office Action dated Jan. 8, 2019, in Japanese Patent Application No. 2015-011654.
Decision of Refusal dated Sep. 3, 2019, in Japanese Patent Application No. 2015-011654.
Office Action dated Nov. 19, 2019, in Chinese Patent Application No. 201680011705.0.
Office Action dated Jun. 23, 2020, in Japanese Patent Application No. 2019-187588.
Office Action dated Jun. 17, 2020, in Chinese Patent Application No. 201680011705.0.
Office Action dated Nov. 27, 2020, in Chinese Patent Application No. 201680011705.0.
Decision of Rejection dated Mar. 23, 2021, in Chinese Patent Application No. 201680011705.0.

* cited by examiner

OPTICAL SYSTEM, OPTICAL DEVICE COMPRISING OPTICAL SYSTEM, AND METHOD FOR MANUFACTURING OPTICAL SYSTEM

TECHNICAL FIELD

The present invention relates to an optical system, an optical device comprising the optical system and a method for manufacturing the optical system.

BACKGROUND ART

Optical systems optimal for application in photographic cameras, electronic still cameras, video cameras and the like have been proposed in the related art (see, for instance, Patent Document #1).

CITATION LIST

Patent Literature

Patent Document #1: Japanese Laid Open Patent Publication No. 2013-033178

SUMMARY OF INVENTION

Technical Problem

With the advent of image sensors achieving higher pixel counts, the pursuit of optical systems assuring good correction of various types of aberration such as chromatic aberration has been intensified in recent years.

Solution to Problem

To address the aforementioned problem, the present invention provides apparatus and methods wherein a first lens group having a positive refractive power, a second lens group having a negative refractive power and a third lens group having a positive refractive power are disposed in sequence along an optical axis starting on an object side, the second lens group moves along the optical axis upon focusing from an infinity-distance object to a short-distance object, and specific conditional expressions are satisfied.

According to the 1st aspect of the present invention, an optical system comprises, disposed in sequence starting on an object side along an optical axis: a first lens group having a positive refractive power; a second lens group having a negative refractive power; and a third lens group having a positive refractive power, wherein: the second lens group moves along the optical axis upon focusing from an infinity-distance object to a short-distance object; and a following conditional expression is satisfied:

$$1.00 < f/(-f2) < 2.40$$

where:
  f: a focal length of the optical system in an infinity in-focus state; and
  f2: a focal length of the second lens group.

According to the 2nd aspect of the present invention, in the optical system according to the first aspect, it is preferred that a following conditional expression is satisfied:

$$0.80 < f/f1 < 1.60$$

where:
  f: a focal length of the optical system in an infinity in-focus state; and
  f1: a focal length of the first lens group.

According to the 3rd aspect of the present invention, an optical system comprises, disposed in sequence starting on an object side along an optical axis: a first lens group having a positive refractive power; a second lens group having a negative refractive power; and a third lens group having a positive refractive power, wherein: the second lens group moves along the optical axis upon focusing from an infinity-distance object to a short-distance object; and a following conditional expression is satisfied:

$$0.80 < f/f1 < 1.60$$

where:
  f: a focal length of the optical system in an infinity in-focus state; and
  f1: a focal length of the first lens group.

According to the 4th aspect of the present invention, in the optical system according to any one of the 1st through 3rd aspects, it is preferred that a following conditional expression is satisfied:

$$0.80 < f1/(-f2) < 1.45$$

where:
  f1: a focal length of the first lens group; and
  f2: a focal length of the second lens group.

According to the 5th aspect of the present invention, in the optical system according to any one of the 1st through 4th aspects, it is preferred that a following conditional expression is satisfied:

$$1.11 < f1/f3 < 1.50$$

where:
  f1: a focal length of the first lens group; and
  f3: a focal length of the third lens group.

According to the 6th aspect of the present invention, in the optical system according to any one of the 1st through 5th aspects, it is preferred that a following conditional expression is satisfied:

$$0.70 < (-f2)/f3 < 1.50$$

where:
  f2: a focal length of the second lens group; and
  f3: a focal length of the third lens group.

According to the 7th aspect of the present invention, in the optical system according to any one of the 1st through 6th aspects, it is preferred that a following conditional expression is satisfied:

$$1.20 < TL/f1 < 2.05$$

where:
  TL: a total length of the optical system; and
  f1: a focal length of the first lens group.

According to the 8th aspect of the present invention, in the optical system according to any one of the 1st through 7th aspects, it is preferred that a following conditional expression is satisfied:

$$1.50 < TL/(-f2) < 3.10$$

where:
  TL: a total length of the optical system; and
  f2: a focal length of the second lens group.

According to the 9th aspect of the present invention, in the optical system according to any one of the 1st through 8th aspects, it is preferred that a following conditional expression is satisfied:

$$63.00 < vp$$

where:
vp: an average value of Abbe numbers of all positive lenses included in the first lens group.

According to the 10th aspect of the present invention, in the optical system according to any one of the 1st through 9th aspects, it is preferred that the first lens group remains fixed upon focusing from the infinity-distance object to the short-distance object.

According to the 11th aspect of the present invention, in the optical system according to any one of the 1st through 12th aspects, it is preferred that the third lens group remains fixed upon focusing from the infinity-distance object to the short-distance object.

According to the 12th aspect of the present invention, in the optical system according to any one of the 1st through 11th aspects, it is preferred that the first lens group comprises a cemented lens; and the cemented lens comprises a positive lens and a negative lens disposed in sequence starting on the object side.

According to the 13th aspect of the present invention, in the optical system according to any one of the 1st through 12th aspects, it is preferred that the third lens group comprises an aperture stop.

According to the 14th aspect of the present invention, in the optical system according to any one of the 1st through 13th aspects, it is preferred that the optical system further comprises an aperture stop; a lens surface present next to the aperture stop on the object side thereof is a lens surface with a convex shape having convexity toward the object side; and a lens surface present next to the aperture stop on an image side thereof is a lens surface with a convex shape having convexity toward the image side.

According to the 15th aspect of the present invention, in the optical system according to any one of the 1st through 14th aspects, it is preferred that the third lens group comprises a positive lens at an end closest to the object side and a negative lens next to the positive lens.

According to the 16th aspect of the present invention, in the optical system according to any one of the 1st through 15th aspects, it is preferred that the second lens group comprises a cemented lens; the cemented lens comprises a positive lens and a negative lens disposed in sequence starting on the object side; and the second lens group is made up with the cemented lens or is made up with a negative lens and the cemented lens disposed in sequence starting on the object side.

According to the 17th aspect of the present invention, in the optical system according to any one of the 1st through 16th aspects, it is preferred that the third lens group comprises at least one aspherical surface.

According to the 18th aspect of the present invention, in the optical system according to any one of the 1st through 17th aspects, it is preferred that at least part of the third lens group moves in a direction having a component perpendicular to the optical axis.

According to the 19th aspect of the present invention, in the optical system according to any one of the 1st through 18th aspects, it is preferred that an anti-reflection film is disposed at at least one surface among optical surfaces in the first lens group through the third lens group; and the anti-reflection film comprises at least one layer formed through a wet process.

According to the 20th aspect of the present invention, in the optical system according to the 19th aspect, it is preferred that nd representing a refractive index of the layer formed through the wet process, at a d-line (wavelength λ=587.6 nm), is equal to or less than 1.30.

According to the 21st aspect of the present invention, an optical device comprises the optical system according to any one of claims 1 through 20.

According to the 22nd aspect of the present invention, a method for manufacturing an optical system that comprises a first lens group having a positive refractive power, a second lens group having a negative refractive power and a third lens group having a positive refractive power, disposed in sequence along an optical axis starting on an object side, comprises: achieving that the second lens group moves along the optical axis upon focusing from an infinity-distance object to a short-distance object; and achieving that a following conditional expression is satisfied:

$$1.00<f/(-f2)<2.40$$

where:
f: a focal length of the optical system in an infinity in-focus state; and
f2: a focal length of the second lens group.

According to the 23rd aspect of the present invention, in the method for manufacturing an optical system according to the 22nd aspect, it is preferred that the method further comprises a step of: disposing an anti-reflection film at at least one surface among optical surfaces in the first lens group through the third lens group, wherein: the anti-reflection film comprises at least one layer formed through a wet process.

According to the 24th aspect of the present invention, a method for manufacturing an optical system that comprises a first lens group having a positive refractive power, a second lens group having a negative refractive power and a third lens group having a positive refractive power, disposed in sequence along an optical axis starting on an object side, comprises: achieving the second lens group moves along the optical axis upon focusing from an infinity-distance object to a short-distance object; and achieving that a following conditional expression is satisfied:

$$0.80<f/f1<1.60$$

where:
f: a focal length of the optical system in an infinity in-focus state; and
f1: a focal length of the first lens group.

DESCRIPTION OF EMBODIMENTS

Figure 1:
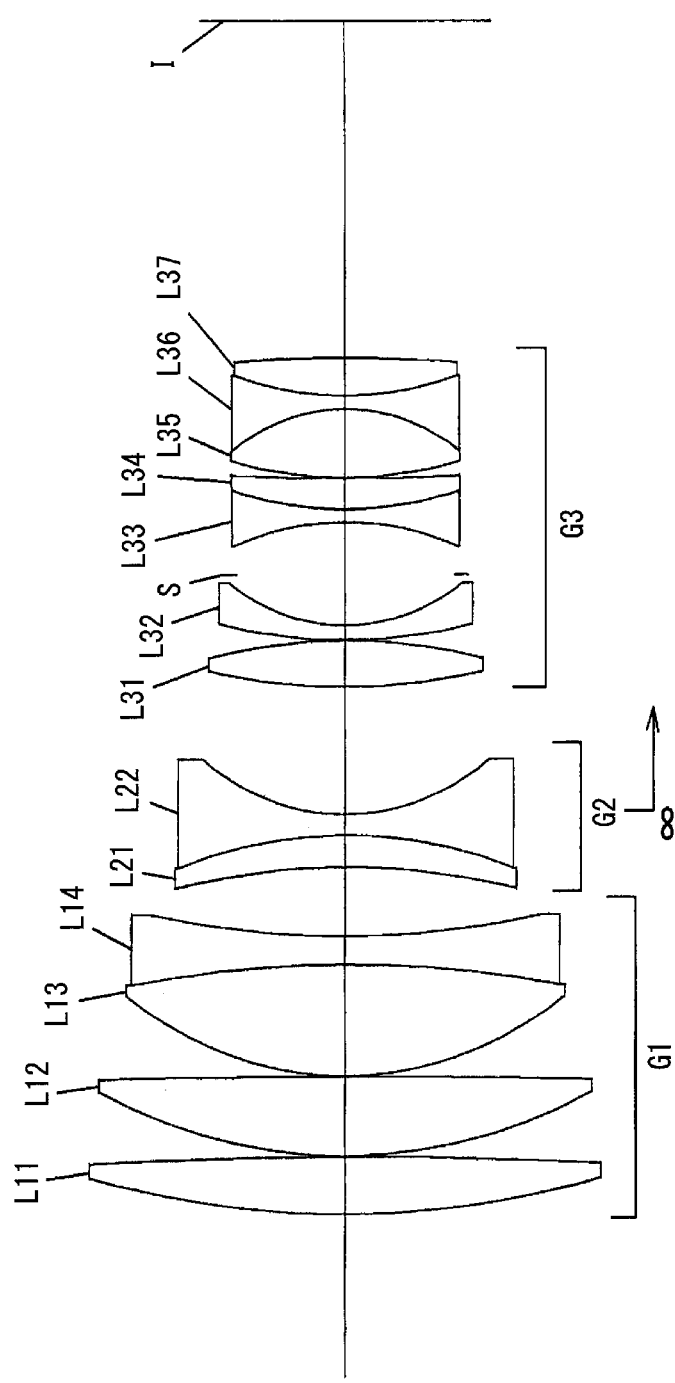
FIG. 1 is a figure showing a sectional view of the lens configuration adopted in an optical system achieved in a first example of the present invention.

The following is a description of embodiments of an optical system, an optical device and a method for manufacturing the optical system achieved in embodiments of the present invention. The optical system achieved in an embodiment comprises a first lens group having a positive refractive power, a second lens group having a negative refractive power and a third lens group having a positive refractive power, disposed in this order along an optical axis starting from an object side. Upon focusing from an infinity-distance object to a short-distance object, the second lens group moves along the optical axis.

In the optical system achieved in the embodiment described above, the second lens group is made to move along the optical axis as a focusing lens group when focus is adjusted from an infinity-distance object to a short-distance object and, as a result, the extent of aberration fluctuation occurring during the focusing operation can be reduced. In addition, such a focusing lens group can be provided as a lightweight unit, thus enabling speedy focusing.

It is desirable that the optical system in the embodiment satisfy the in the following conditional expression (1) below.

$$1.00 < f/(-f2) < 2.40 \qquad (1)$$

where:
f: a focal length of the optical system in an infinity in-focus state; and
f2: a focal length of the second lens group.

Conditional expression (1) above defines the focal length of the optical system in the infinity in-focus state and the focal length of the second lens group in the embodiment. The optical system in the embodiment satisfying conditional expression (1) assures good correction of spherical aberration and field curvature while limiting its total length.

It is not desirable for f/(−f2) to be less than the lower limit set in conditional expression (1), since the refractive power of the second lens group will be lower, thereby spherical aberration will be under-corrected and it will also be difficult to achieve sufficient correction of field curvature under such circumstances. Furthermore, the distance over which the focusing lens group, i.e., the second lens group, needs to move for purposes of focusing is bound to be greater, resulting in an increase in the total length of the optical system. It is to be noted that the advantageous effects of the embodiment can be realized with even better reliability by setting the lower limit value in conditional expression (1) to 1.15. The advantageous effects of the present invention may be realized with even further reliability by setting the lower limit value in conditional expression (1) to 1.30.

At the same time, it is not desirable for f/(−f2) to take a value above the upper limit set in conditional expression (1) since the second lens group will have a higher refractive power, and thereby spherical aberration will be over-corrected and it will also be difficult to correct field curvature under such circumstances. It is to be noted that the advantageous effects of the embodiment can be realized with even better reliability by setting the upper limit value in conditional expression (1) to 2.20. The advantageous effects of the embodiment may be realized with even further reliability by setting the upper limit value in conditional expression (1) to 2.00.

An optical system with a relatively large focal length and a small F number is able to provide outstanding optical performance over a full range from infinity to a short-distance object point by adopting the structure described above.

It is also desirable that the optical system in the embodiment satisfy the following conditional expression (2) below:

$$0.80 < f/f1 < 1.60 \qquad (2)$$

where:
f: a focal length of the optical system in the infinity in-focus state; and
f1: a focal length of the first lens group.

Conditional expression (2) above defines the focal length of the overall optical system and the focal length of the first lens group in the embodiment. The optical system in the embodiment satisfying conditional expression (2) assures good correction of field curvature and comatic aberration while limiting its total length.

It is not desirable for f/f1 to be less than the lower limit set in conditional expression (2), since the refractive power of the first lens group will be lower, and thereby the total length of the optical system is bound to increase and it will be difficult to assure a sufficient amount of peripheral light under such circumstances. In addition, while the refractive power of the third lens group may be raised in order to reduce the total length of the optical system, an increase in the refractive power of the third lens group will result in difficulty in correction of spherical aberration and field curvature. It is to be noted that the advantageous effects of the embodiment can be realized with even better reliability by setting the lower limit value in conditional expression (2) to 0.90. The advantageous effects of the present invention may be realized with even further reliability by setting the lower limit value in conditional expression (2) to 1.00.

At the same time, it is not desirable for f/f1 to take a value above the upper limit set in conditional expression (2) since the first lens group will have a higher refractive power, and thereby it will be difficult to correct spherical aberration, comatic aberration and field curvature under such circumstances. It is to be noted that the advantageous effects of the embodiment can be realized with even better reliability by setting the upper limit value in conditional expression (2) to 1.50. The advantageous effects of the present invention may be realized with even further reliability by setting the upper limit value in conditional expression (2) to 1.35.

In addition, it is desirable that the optical system in the embodiment satisfy the following conditional expression (3) below:

$$0.80 < f1/(-f2) < 1.45 \qquad (3)$$

where:
f1: a focal length of the first lens group; and
f2: a focal length of the second lens group.

Conditional expression (3) above defines the focal length of the first lens group and the focal length of the second lens group in the embodiment. The optical system in the embodiment satisfying conditional expression (3) assures good correction of spherical aberration and field curvature while limiting its total length.

It is not desirable for f1/(-f2) to be less than the lower limit set in conditional expression (3), since the refractive power of the second lens group will be lower, and thereby spherical aberration will be under-corrected and it will also be difficult to achieve sufficient correction of field curvature under such circumstances. Furthermore, the distance over which the focusing lens group, i.e., the second lens group, needs to move for purposes of focusing is bound to be greater, resulting in an increase in the total length of the optical system. It is to be noted that the advantageous effects of the embodiment can be realized with even better reliability by setting the lower limit value in conditional expression (3) to 0.90. The advantageous effects of the embodiment may be realized with even further reliability by setting the lower limit value in conditional expression (3) to 1.00.

At the same time, it is not desirable for f1/(-f2) to take a value above the upper limit set in conditional expression (3) since the second lens group will have a higher refractive power, and thereby spherical aberration will be over-corrected and it will also be difficult to correct field curvature under such circumstances. It is to be noted that the advantageous effects of the embodiment can be realized with even better reliability by setting the upper limit value in conditional expression (3) to 1.44. The advantageous effects of the embodiment may be realized with even further reliability by setting the upper limit value in conditional expression (3) to 1.42.

It is also desirable that the optical system in the embodiment satisfy the following conditional expression (4) below.

$$1.11 < f1/f3 < 1.50 \qquad (4)$$

where:
f1: a focal length of the first lens group; and
f3: a focal length of the third lens group.

Conditional expression (4) above defines the focal length of the first lens group and the focal length of the third lens group in the embodiment. The optical system in the embodiment satisfying conditional expression (4) assures good correction of field curvature and comatic aberration while limiting its total length.

It is not desirable for f1/f3 to exceed the upper limit set in conditional expression (4), since the refractive power of the first lens group will be lower, and thereby the total length of the optical system is bound to increase and it will also be difficult to assure a sufficient amount of peripheral light under such circumstances. In addition, while the refractive power of the third lens group may be raised in order to reduce the total length of the optical system, an increase in the refractive power of the third lens group will result in difficulty in correction of spherical aberration and field curvature. It is to be noted that the advantageous effects of the embodiment can be realized with even better reliability by setting the upper limit value in conditional expression (4) to 1.40. The advantageous effects of the embodiment may be realized with even further reliability by setting the upper limit value in conditional expression (4) to 1.30.

At the same time, it is not desirable for f1/f3 to take a value below the lower limit set in conditional expression (4), since the first lens group will have a higher refractive power, and thereby it will be difficult to correct spherical aberration, comatic aberration and field curvature under such circumstances. It is to be noted that the advantageous effects of the present invention can be realized with even better reliability by setting the lower limit value in conditional expression (4) to 1.115.

Furthermore, it is also desirable that the optical system in the embodiment satisfy the following conditional expression (5) below.

$$0.70 < (-f2)/f3 < 1.50 \qquad (5)$$

where:
f2: a focal length of the second lens group; and
f3: a focal length of the third lens group.

Conditional expression (5) above defines the focal length of the second lens group and the focal length of the third lens group according to the present invention. The optical system in the embodiment satisfying in conditional expression (5) assures good correction of spherical aberration and field curvature while limiting its total length.

It is not desirable for (-f2)/f3 to exceed the upper limit set in conditional expression (5), since the refractive power of the second lens group will be lower, and thereby spherical aberration will be under-corrected and it will also be difficult to achieve sufficient correction of field curvature under such circumstances. Furthermore, the distance over which the focusing lens group, i.e., the second lens group, needs to move for purposes of focusing is bound to be greater, resulting in an increase in the total length of the optical system. It is to be noted that the advantageous effects of the embodiment can be realized with even better reliability by setting the upper limit value in conditional expression (5) to 1.35. The advantageous effects of the present invention may be realized with even further reliability by setting the upper limit value in conditional expression (5) to 1.20.

At the same time, it is not desirable for (-f2)/f3 to take a value below the lower limit set in conditional expression (5) since the second lens group will have a higher refractive power, and thereby spherical aberration will be over-corrected and it will also be difficult to correct image field curvature under such circumstances. It is to be noted that the advantageous effects of the embodiment can be realized with even better reliability by setting the lower limit value in conditional expression (5) to 0.75. The advantageous effects of the embodiment may be realized with even further reliability by setting the lower limit value in conditional expression (5) to 0.80.

It is also desirable that the optical system in the embodiment satisfy the following conditional expression (6) below.

$$1.20 < TL/f1 < 2.05 \qquad (6)$$

where:
TL: a total length of the optical system; and
f1: a focal length of the first lens group.

Conditional expression (6) above defines the total length of the optical system and the focal length of the first lens group in the embodiment. The optical system in the embodiment satisfying conditional expression (6) assures good correction of field curvature and comatic aberration while limiting its total length.

It is not desirable for TL/f1 to take a value below the lower limit set in conditional expression (6), since the refractive power of the first lens group will be lower, and thereby the total length of the optical system is bound to increase and it will also be difficult to assure a sufficient amount of peripheral light under such circumstances. In addition, while the refractive power of the third lens group may be raised in order to reduce the total length of the optical system, an increase in the refractive power of the third lens group will result in difficulty in correction of spherical aberration and field curvature. It is to be noted that the advantageous effects of the embodiment can be realized with even better reliability by setting the lower limit value in conditional expression (6) to 1.40. The advantageous effects of the embodiment may be realized with even further reliability by setting the lower limit value in conditional expression (6) to 1.60.

At the same time, it is not desirable for TL/f1 to take a value above the upper limit set in conditional expression (6) since the first lens group will have a higher refractive power and it will be difficult to correct spherical aberration, comatic aberration and field curvature under such circumstances. It is to be noted that the advantageous effects of the present invention can be realized with even better reliability by setting the upper limit value in conditional expression (6) to 2.03. Moreover, the advantageous effects of the present invention can be further enhanced by setting the upper limit value in conditional expression (6) to 2.00.

Furthermore, it is also desirable that the optical system in the embodiment satisfy the following conditional expression (7) below.

$$1.50 < TL/(-f2) < 3.10 \qquad (7)$$

TL: a total length of the optical system; and
f2: a focal length of the second lens group.

Conditional expression (7) above defines the total length of the optical system and the focal length of the second lens group in the embodiment. The optical system in the embodiment satisfying conditional expression (7) assures good correction of field curvature and comatic aberration while limiting its total length.

It is not desirable for TL/(−f2) to take a value below the lower limit set in conditional expression (7), since the refractive power of the second lens group will be lower, and thereby the total length of the optical system is bound to increase and it will also be difficult to assure a sufficient amount of peripheral light under such circumstances. In addition, while the refractive power of the third lens group may be raised in order to reduce the total length of the optical system, an increase in the refractive power of the third lens group will result in difficulty in correction of spherical aberration and field curvature. It is to be noted that the advantageous effects of the embodiment can be realized with even better reliability by setting the lower limit value in conditional expression (7) to 1.70. The advantageous effects of the present invention may be realized with even further reliability by setting the lower limit value in conditional expression (7) to 1.90.

At the same time, it is not desirable for TL/(−f2) to take a value above the upper limit set in conditional expression (7), since the second lens group will have a higher refractive power, and thereby it will be difficult to correct spherical aberration, comatic aberration and field curvature under such circumstances. It is to be noted that the advantageous effects of the present invention can be realized with even better reliability by setting the upper limit value in conditional expression (7) to 3.00. Moreover, the advantageous effects of the embodiment can be further enhanced by setting the upper limit value in conditional expression (7) to 2.90.

It is also desirable that the optical system in the embodiment satisfy in the following conditional expression (8) below.

$$63.00 < vp \qquad (8)$$

vp: average value of Abbe numbers of all the positive lenses included in the first lens group.

Conditional expression (8) above defines the average of the Abbe numbers of all the positive lenses included in the first lens group in the embodiment. The optical system in the embodiment satisfying conditional expression (8) assures good correction of axial chromatic aberration.

It is not desirable for vp to be less than the lower limit set in conditional expression (8), since it will be difficult to assure good correction of axial chromatic aberration under such circumstances. It is to be noted that the advantageous effects of the embodiment can be realized with even better reliability by setting the lower limit value in conditional expression (8) to 65.00. The advantageous effects of the embodiment may be realized with even further reliability by setting the lower limit value in conditional expression (8) to 70.0.

In addition, it is desirable that the first lens group in the optical system in the embodiment remain fixed, upon focusing from an infinity-distance object to a short-distance object. This structure makes it possible to provide a more compact focusing lens group than that of an optical system including two moving lens groups, i.e., the first lens group and the second lens group, and also makes it possible to reduce the occurrence of various types of aberration such as comatic aberration, which is bound to result from error occurring as a plurality of focusing lens groups move.

It is also desirable that the third lens group in the optical system in the embodiment remain fixed, upon focusing from an infinity-distance object to a short-distance object. This structure makes it possible to provide a more compact focusing lens group than that of an optical system including two moving lens groups, i.e., the second lens group and the third lens group, and also makes it possible to reduce the occurrence of various types of aberration such as comatic aberration, which is bound to result from error occurring as a plurality of focusing lens groups move.

It is further desirable that the first lens group in the optical system achieved in the embodiment comprise a cemented lens including a positive lens and a negative lens disposed in this order starting on the object side. This structure assures good correction of spherical aberration and axial chromatic aberration.

In addition, it is desirable that the third lens group in the optical system achieved in the embodiment comprise an aperture stop. Adopting this structure will assure good correction of field curvature and astigmatism.

It is further desirable that the optical system in the embodiment comprise an aperture stop, that a lens surface set next to the aperture stop on the object side be a lens surface with a convex shape having convexity toward the object side and that a lens surface set next to the aperture stop on the image side be a lens surface with a convex shape having convexity toward the image side. This structure assures good correction of spherical aberration, field curvature and astigmatism.

Furthermore, it is desirable that the third lens group in the optical system achieved in the embodiment comprise a positive lens and negative lens disposed next to each other in this order starting from the furthest object side. This structure assures good correction of spherical aberration.

It is also desirable that the second lens group in the optical system achieved in the embodiment comprise a cemented lens constituted with a positive lens and a negative lens disposed in this order starting on the object side, and that the second lens group be constituted with the cemented lens or with a negative lens and the cemented lens disposed in this order starting on the object side. By adopting such a structure, the optical system can be realized as a compact unit assuring good correction of axial chromatic aberration. In addition, the extent of spherical aberration fluctuation occurring during focusing operation can be reduced by adopting this structure.

It is desirable that the third lens group in the optical system achieved in the embodiment include at least one aspherical surface. This structure assures good correction of comatic aberration.

It is further desirable that at least part of the third lens group in the optical system achieved in the embodiment move in a direction having a component perpendicular to the optical axis. This structure makes it possible to correct image blurring (vibration absorption) caused by, for instance, camera shaking. In addition, the extent of aberration fluctuation occurring during image blurring correction can be reduced.

Moreover, it is desirable that an anti-reflection film be disposed at at least one surface among optical surfaces in the first lens group through the third lens group in the optical system achieved in the embodiment and that the anti-reflection film comprise at least one layer formed through a wet process. The extents of ghosting and flare occurring as light from an object is reflected at optical surfaces can be further reduced in the optical system in the embodiment adopting this structure and as a result, a higher level of image forming performance is achieved.

In addition, it is desirable that nd, representing the refractive index at the d-line (wavelength λ=587.6 nm) pertaining to the layer formed through the wet process be equal to or less than 1.30 in the optical system achieved in the embodiment. Since this structure limits the refractive index difference between the layer and the air, light reflection will be further reduced, which in turn will make it possible to further reduce the extents of ghosting and flare.

It is to be noted that the anti-reflection film in the optical system in the embodiment may be formed through a dry process or the like instead of a wet process. In such a case, it is desirable to form the anti-reflection film so that it comprises at least one layer with a refractive index equal to or less than 1.30. In conjunction with an anti-reflection film formed through a dry process or the like as described above, advantages similar to those achieved via the anti-reflection film formed through the wet process can be realized. It is desirable that the layer with the refractive index equal to or less than 1.30 be the topmost layer on the surface side among the layers constituting the multilayer film.

The optical device achieved in the embodiment comprises the optical system structured as described above. In this optical device, the extents of ghosting and flare can be further reduced and aberration fluctuation occurring during image blurring correction can be controlled in a desirable manner.

Through a method for manufacturing an optical system achieved in an embodiment, an optical system that comprises a first lens group having a positive refractive power, a second lens group having a negative refractive power and a third lens group having a positive refractive power, disposed in this order along the optical axis starting on the object side, is manufactured by achieving that the second lens group is made to move along the optical axis upon focusing from an infinity-distance object to a short-distance object and that conditions as expressed in predetermined conditional expression (1) below are satisfied.

$$1.00 < f/(-f2) < 2.40 \tag{1}$$

where:
f: a focal length of the optical system in an infinity in-focus state; and
f2: a focal length of the second lens group.

Through a method for manufacturing an optical system achieved in the embodiment as described above, an optical system assuring outstanding optical performance through a wide range from an infinity-distance object point to a short-distance object point, can be manufactured.

Through a method for manufacturing an optical system achieved in another embodiment of the present invention, an optical system that comprises a first lens group having a positive refractive power, a second lens group having a negative refractive power and a third lens group having a positive refractive power, disposed in this order along the optical axis starting on the object side, is manufactured by achieving that the second lens group is made to move along the optical axis upon focusing from an infinity-distance object to a short-distance object and that conditions expressed in predetermined conditional expression (2) below are satisfied.

$$0.80 < f/f1 < 1.60 \tag{2}$$

where:
f: a focal length of the optical system in an infinity in-focus state; and
f1: a focal length of the first lens group.

Through a method for manufacturing an optical system achieved in the embodiment as described above, an optical system assuring outstanding optical performance through a wide range from an infinity-distance object point to a short-distance object point, can be manufactured.

The following is a description, given in reference to the attached drawings, of the optical system according to the present invention, achieved in examples in conjunction with specific numerical values.

First Example

FIG. 1 illustrates a lens configuration adopted in an optical system in the first example of the present invention.

The optical system achieved in the example is configured with a first lens group G1 having a positive refractive power, a second lens group G2 having a negative refractive power and a third lens group G3 having a positive refractive power, disposed in this order along the optical axis, starting on the object side.

The first lens group G1 having the positive refractive power is constituted with a bi-convex positive lens L11, a bi-convex positive lens L12, and a cemented lens achieved by bonding together a bi-convex positive lens L13 and a bi-concave negative lens L14 disposed in this order starting on the object side.

The second lens group G2 having the negative refractive power is constituted of a cemented lens achieved by bonding together a positive meniscus lens L21 with its concave surface facing the object side and a bi-concave negative lens L22, disposed in this order starting on the object side.

The third lens group G3 with the positive refractive power is constituted with a bi-convex positive lens L31, a negative meniscus lens L32 with its convex surface facing the object side, an aperture stop S, a cemented lens constituted with a bi-concave negative lens L33 and a positive meniscus lens L34 with its convex surface facing the object side, and a cemented lens achieved by bonding together a bi-convex positive lens L35, a bi-concave negative lens L36 and a bi-convex positive lens L37 disposed in this order starting on the object side.

The surface (surface number 22) in the third lens group G3, which is located closest to the image, is an aspherical surface in the optical system achieved in the example.

In the optical system achieved in the example, the first lens group G1 and the third lens group G3 are fixed relative to the image surface, and the entire second lens group G2 moves toward the image side along the optical axis upon focusing from an infinity-distance object to a short-distance object.

In the optical system achieved in the example, image blurring can be corrected as the cemented lens constituted with the negative lens L33 and the positive meniscus lens L34, which is disposed next to the aperture stop S on the image side of the aperture stop S moves as a vibration-proofing lens group in a direction having a component perpendicular to the optical axis.

The optical system achieved in the example comprises an anti-reflection film formed so as to comprise at least one layer formed through a wet process, disposed at a lens surface (surface number 19) closest to the object side in the cemented lens, which is constituted with the positive lens L35, the negative lens L36 and the positive lens L37 and is located closest to the image side.

Table 1 below lists data values pertaining to the optical system achieved in the first example.

In [Overall Specifications] in Table 1, "f" indicates the focal length, "FNO" indicates the F number, "2ω" indicates the field angle (unit: "○"), "Y" indicates the image height, "TL" indicates the total length of the optical system and "Bf" indicates the back focus. It is to be noted that the total length TL indicates the distance measured on the optical axis from the lens surface (first surface) in the optical system, which is located closest to the object side, to the image surface and that the back focus Bf indicates the distance measured along the optical axis from the lens surface (22nd surface) in the optical system, which is located closest to the image side, to the image surface.

In addition, in "Surface Data", "surface number" indicates the order with which a given optical surface is located, counting along the optical axis from the object side, "r" indicates the radius of curvature of each optical surface, "d" indicates a surface distance (the distance between an nth surface (n is an integer) and an n+1th surface), "nd" indicates the refractive index at the d-line and "νd" indicates the Abbe number at the d-line (wavelength λ=587.6 nm). In addition, "object surface" indicates an object surface, "(aperture S)" indicates the aperture stop S and "variable" indicates a variable surface distance. The radius of curvature r=∞ means a flat surface and the refractive index nd=1.00000 of air is not included in the table. Each aspherical surface is marked with "*" affixed to the right side of its surface number.

In "Lens Group Focal Length", the surface number of the surface located closest to the object side in each lens group (starting surface) and the focal length of each of the particular lens group are indicated.

In "Aspherical Surface Data", the conic constant and aspherical coefficients of the shape of each aspherical surface indicated in [Surface Data], expressed as in the following equation, are indicated. It is to be noted that "E-n" means "×10$^{-n}$". For instance, "1.234E-05" means "1.234×10$^{-5}$". The aspherical coefficient A2 of the second order is 0.

$$X(y)=(y^2/r)/[1+[1-\kappa((y^2/r^2)]^{1/2}]+A4\times y^4+A6\times y^6+A8\times y^8+A10\times y^{10}$$

"y" in the equation above represents the height measured along the direction perpendicular to the optical axis, "S(y)" represents the distance (sag quantity) measured along the optical axis from the tangent plane of the vertex of each aspherical surface to the particular aspherical surface at the height y, "r" indicates the radius of curvature at a reference spherical surface (paraxial curvature radius), "κ" indicates the conic constant and "An" indicates the aspherical coefficient of the nth order.

In "Variable Distance Data", "f" indicates the focal length of the entire system, "β" indicates the image forming magnification factor with which the object is magnified in the image, "Di" (i is an integer) indicates a variable surface distance pertaining to an ith surface. In addition, "Infinite" indicates the infinity in-focus state and "Close-up" indicates the closest possible shooting distance state. It is to be noted that D0 indicates the distance from the object to the first surface.

While "mm" is normally used as the unit for length, such as the focal length f, the radius of curvature r and the surface distance d, among all the data values below, equivalent optical performance can be achieved in an optical system that is either proportionally expanded or proportionally reduced and thus, the applicable unit is not limited to "mm". In addition, the reference symbols and the data notations described above are applicable in subsequent examples as well.

TABLE 1

[Overall Specifications]

f = 102.128
FNO = 1.449
2ω = 23.891
Y = 21.60
TL = 146.818
Bf = 41.301

[Surface Data]

| Surface Number | r | d | nd | νd |
|---|---|---|---|---|
| Object Surface | ∞ | ∞ | | |
| 1 | 176.41170 | 7.081 | 1.59349 | 67.00 |
| 2 | −997.05190 | 0.100 | | |
| 3 | 96.85690 | 9.766 | 1.49782 | 82.57 |
| 4 | −2499.53100 | 0.100 | | |
| 5 | 64.16290 | 13.758 | 1.49782 | 82.57 |
| 6 | −222.06850 | 3.500 | 1.73800 | 32.26 |
| 7 | 171.04680 | variable | | |
| 8 | −136.08080 | 4.000 | 1.80809 | 22.74 |

TABLE 1-continued

| | | | | |
|---|---|---|---|---|
| 9 | −85.91600 | 2.500 | 1.48749 | 70.32 |
| 10 | 40.41360 | variable | | |
| 11 | 121.43430 | 5.687 | 1.72916 | 54.61 |
| 12 | −106.55980 | 0.100 | | |
| 13 | 97.96380 | 1.800 | 1.61505 | 35.73 |
| 14 | 33.61330 | 6.326 | | |
| 15(aperture S) | ∞ | 6.526 | | |
| 16 | −52.40880 | 1.600 | 1.59238 | 35.86 |
| 17 | 71.14860 | 3.733 | 1.72916 | 54.61 |
| 18 | 478.61380 | 0.100 | | |
| 19 | 80.79100 | 8.330 | 1.75596 | 49.76 |
| 20 | −33.83920 | 1.600 | 1.58128 | 37.40 |
| 21 | 61.41580 | 4.724 | 1.89799 | 34.84 |
| 22* | −225.35840 | BF | | |
| Image surface | ∞ | | | |

[Lens Group Focus length]

| Group | Starting Surface | Focal Length |
|---|---|---|
| 1 | 1 | 81.118 |
| 2 | 8 | −69.336 |
| 3 | 11 | 72.558 |

[Aspherical Surface Data]

| | κ | A4 | A6 | A8 | A10 |
|---|---|---|---|---|---|
| No. 22 surface | 1 | 9.931E−07 | −1.978E−09 | 8.134E−12 | −1.116E−14 |

[Variable Distance Data]

| | Infinite | Close-up |
|---|---|---|
| f or β | 102.128 | −0.136x |
| D7 | 8.522 | 18.522 |
| D10 | 15.664 | 5.664 |

[Values Corresponding to Conditional Expressions]

(1) f/(−f2) = 1.47
(2) f/f1 = 1.26
(3) f1/(−f2) = 1.17
(4) f1/f3 = 1.12
(5) (−f2)/f3 = 0.96
(6) TL/f1 = 1.81
(7) TL/(−f2) = 2.12
(8) νP = 77.38

As indicated above, the optical system achieved in the first example satisfies all the conditions expressed in conditional expressions (1) through (8).

Figure 2:
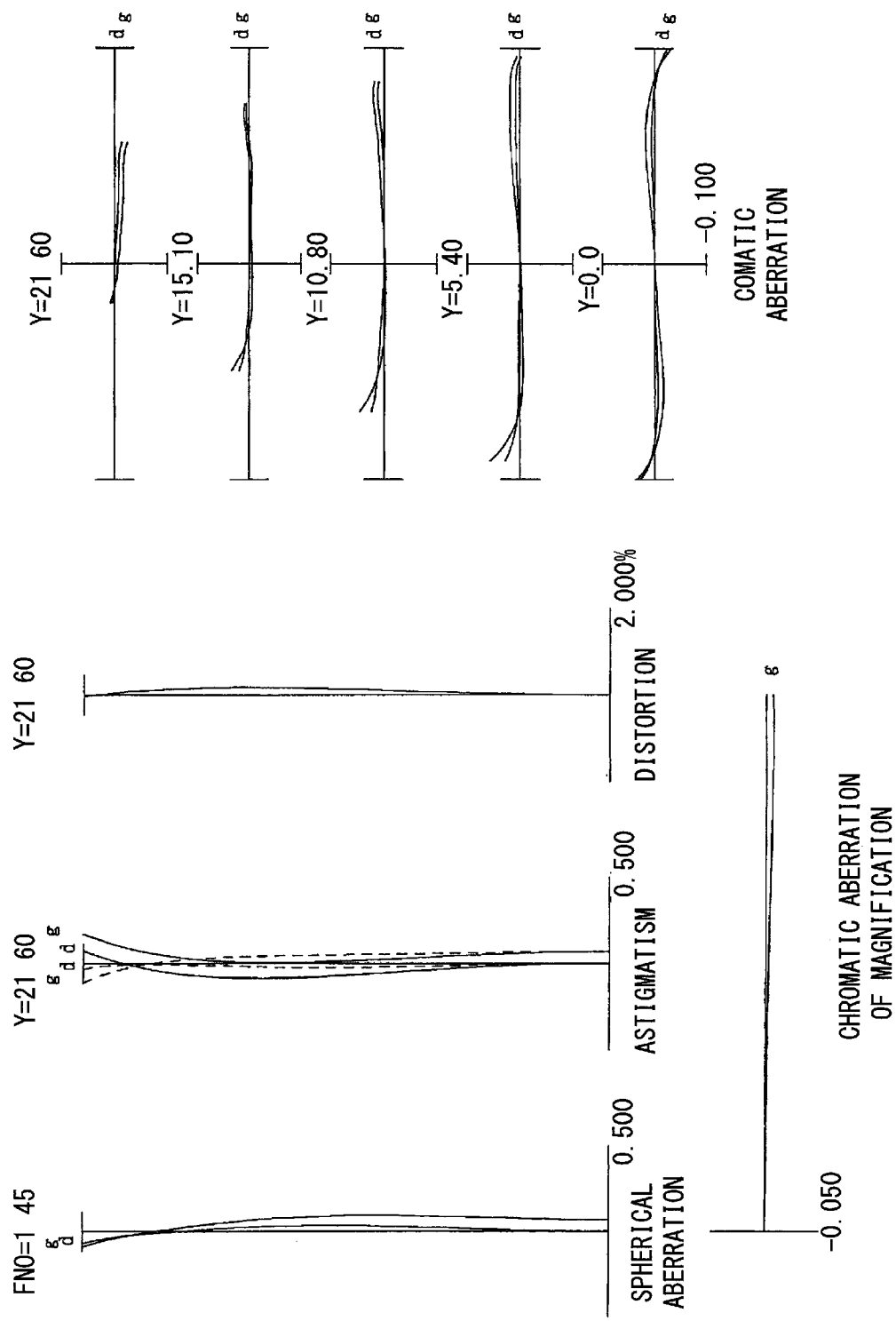
FIG. 2 is a figure showing diagrams of various types of aberration occurring at the optical system in the first example of the present invention in an infinity in-focus state.
Figure 3:
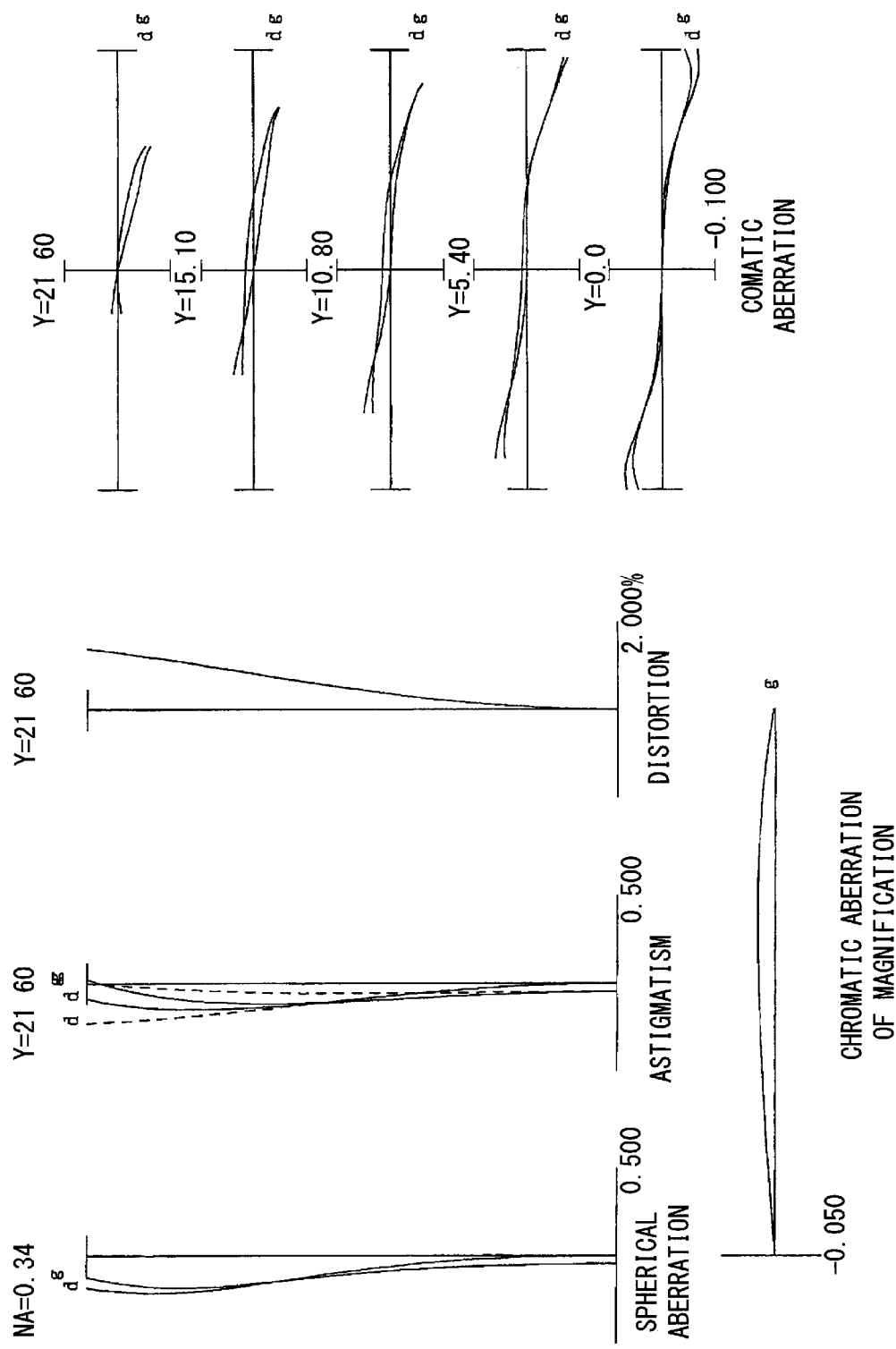
FIG. 3 is a figure showing diagrams of various types of aberration occurring at the optical system in the first example of the present invention in a close-up shooting distance state.

FIG. 2 provides diagrams pertaining to various types of aberration, i.e., spherical aberration, astigmatism, distortion, chromatic aberration of magnification and comatic aberration, occurring at the optical system in the first example in an infinity in-focus state. In addition, FIG. 3 provides diagrams pertaining to the various types of aberration, i.e., spherical aberration, astigmatism, distortion, chromatic aberration of magnification and comatic aberration, occurring in a short-distance in-focus state with the photographic magnification factor β set to −0.136. "FNO" and "Y" in these aberration diagrams respectively represent the F number and the image height. In addition, "d" and "g" in the aberration diagrams respectively indicate the aberration at the d-line (wavelength λ=587.6 nm) and the aberration at the g-line (wavelength λ=435.8 nm). In each astigmatism diagram, the solid line represents the sagittal image surface and the dotted line represents the meridional image surface. It is to be noted that the notational designations in these aberration diagrams will also be used in the description of subsequent example.

As the various aberration diagrams in FIG. 2 and FIG. 3 clearly indicate, the various types of aberration are well corrected in the optical system achieved in the first example, allowing the optical system to assure a high level of optical performance.

Second Example

Figure 4:
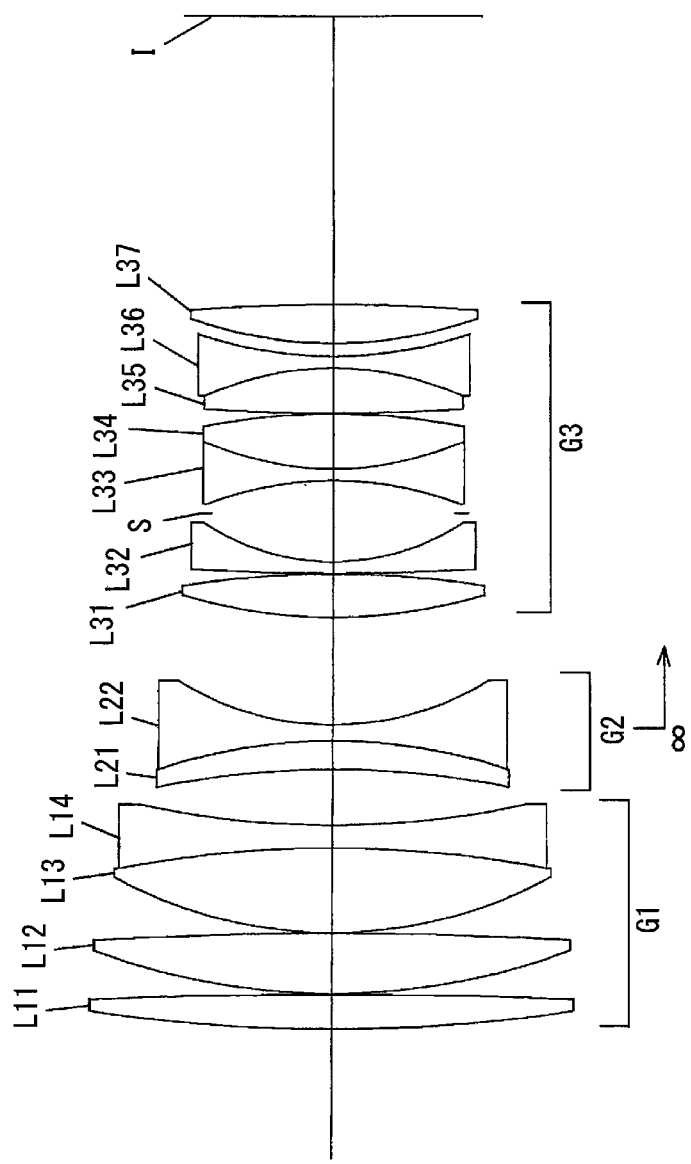
FIG. 4 is a figure showing a sectional view of the lens configuration adopted in an optical system achieved in a second example of the present invention.

FIG. 4 illustrates a lens configuration adopted in an optical system in the second example of the present invention.

The optical system achieved in the example is configured with a first lens group G1 having a positive refractive power, a second lens group G2 having a negative refractive power and a third lens group G3 having a positive refractive power, disposed in this order along the optical axis, starting on the object side.

The first lens group G1 with the positive refractive power is constituted with a bi-convex positive lens L11, a bi-convex positive lens L12, and a cemented lens achieved by bonding a bi-convex positive lens L13 and a bi-concave negative lens L14 disposed in this order starting on the object side.

The second lens group G2 with the negative refractive power is constituted of a cemented lens achieved by bonding together a positive meniscus lens L21 with its concave surface facing the object side and a bi-concave negative lens L22 disposed in this order starting on the object side.

The third lens group G3 with the positive refractive power is constituted with a bi-convex positive lens L31, a negative meniscus lens L32 with its convex surface facing the object side, an aperture stop S, a cemented lens constituted with a bi-concave negative lens L33 and a bi-convex positive lens L34, a cemented lens achieved by bonding together a bi-convex positive lens L35 and a bi-concave negative lens, and a bi-convex positive lens L37 disposed in this order starting on the object side.

The surface (surface number 23) in the third lens group G3, located closest to the image side is an aspherical surface in the optical system achieved in the example.

In the optical system achieved in the example, the first lens group G1 and the third lens group G3 are fixed relative to the image surface and the entire second lens group G2 moves toward the image side along the optical axis upon focusing from an infinity-distance object to a short-distance object.

In the optical system achieved in the example, image blurring can be corrected as the cemented lens constituted with a negative lens L33 and the positive lens L34, which is disposed next to the aperture stop S on the image side of the aperture stop S, moves as a vibration-proofing lens group in a direction having a component perpendicular to the optical axis.

In the optical system achieved in the example, an anti-reflection film, which comprises at least one layer formed through a wet process, is formed at the object-side lens surface (surface number 22) of the positive lens L37 located closest to the image side and also at the image-side lens surface (surface number 21) of the negative lens L36 disposed next to the positive lens L37 on the object side of the positive lens L37.

Table 2 below lists data values pertaining to the optical system achieved in the second example.

TABLE 2

[Overall Specifications]

f = 102.643
FNO = 1.441
2ω = 23.836
Y = 21.60

TABLE 2-continued

TL = 156.819
Bf = 44.626

[Surface Data]

| Surface Number | r | d | nd | vd |
|---|---|---|---|---|
| Object Surface | ∞ | ∞ | | |
| 1 | 232.74460 | 5.460 | 1.59349 | 67.00 |
| 2 | −941.72040 | 0.100 | | |
| 3 | 99.95980 | 9.402 | 1.49782 | 82.57 |
| 4 | −635.59410 | 0.100 | | |
| 5 | 67.81170 | 13.106 | 1.49782 | 82.57 |
| 6 | −170.83160 | 3.500 | 1.64769 | 33.72 |
| 7 | 136.65740 | variable | | |
| 8 | −132.42720 | 4.400 | 1.80809 | 22.74 |
| 9 | −82.87930 | 2.500 | 1.48749 | 70.32 |
| 10 | 43.90050 | variable | | |
| 11 | 76.67630 | 6.700 | 1.74397 | 44.85 |
| 12 | −145.75050 | 0.100 | | |
| 13 | 365.29930 | 1.800 | 1.51742 | 52.20 |
| 14 | 35.15610 | 7.500 | | |
| 15(aperture S) | ∞ | 5.022 | | |
| 16 | −52.41160 | 1.800 | 1.60482 | 34.33 |
| 17 | 48.32170 | 8.500 | 1.76457 | 48.44 |
| 18 | −99.22310 | 0.100 | | |
| 19 | 302.91470 | 7.000 | 1.72916 | 54.61 |
| 20 | −46.57540 | 1.800 | 1.61532 | 33.18 |
| 21 | 63.20750 | 2.000 | | |
| 22 | 63.50280 | 6.000 | 1.90265 | 35.72 |
| 23* | −264.53160 | BF | | |
| Image surface | ∞ | | | |

[Lens Group Focus length]

| Group | Starting Surface | Focal Length |
|---|---|---|
| 1 | 1 | 87.792 |
| 2 | 8 | −74.149 |
| 3 | 11 | 72.509 |

[Aspherical Surface Data]

| | κ | A4 | A6 | A8 | A10 |
|---|---|---|---|---|---|
| No. 23 surface | 1 | 2.199E−07 | −4.073E−11 | −2.713E−13 | 4.702E−16 |

[Variable Distance Data]

| | Infinite | Close-up |
|---|---|---|
| f or β | 102.643 | −0.141x |
| D7 | 8.654 | 20.317 |
| D10 | 16.649 | 4.986 |

[Values Corresponding to Conditional Expressions]

(1) f/(−f2) = 1.38
(2) f/f1 = 1.17
(3) f1/(−f2) = 1.18
(4) f1/f3 = 1.21
(5) (−f2)/f3 = 1.02
(6) TL/f1 = 1.79
(7) TL/(−f2) = 2.11
(8) νP = 77.38

As indicated above, the optical system achieved in the second example satisfies all the conditions expressed in conditional expressions (1) through (8).

Figure 5:
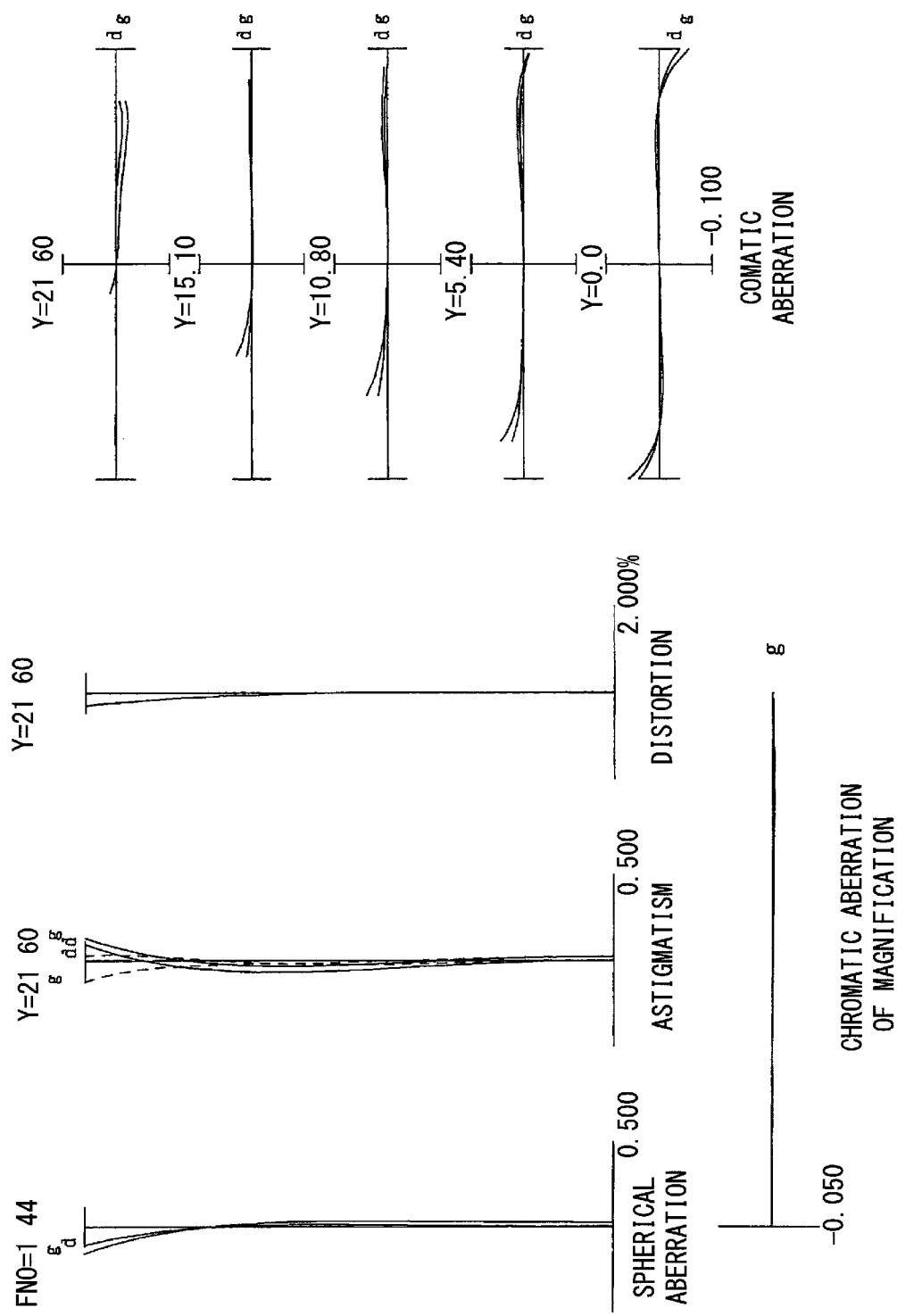
FIG. 5 is a figure showing diagrams of various types of aberration occurring at the optical system in the second example of the present invention in an infinity in-focus state.
Figure 6:
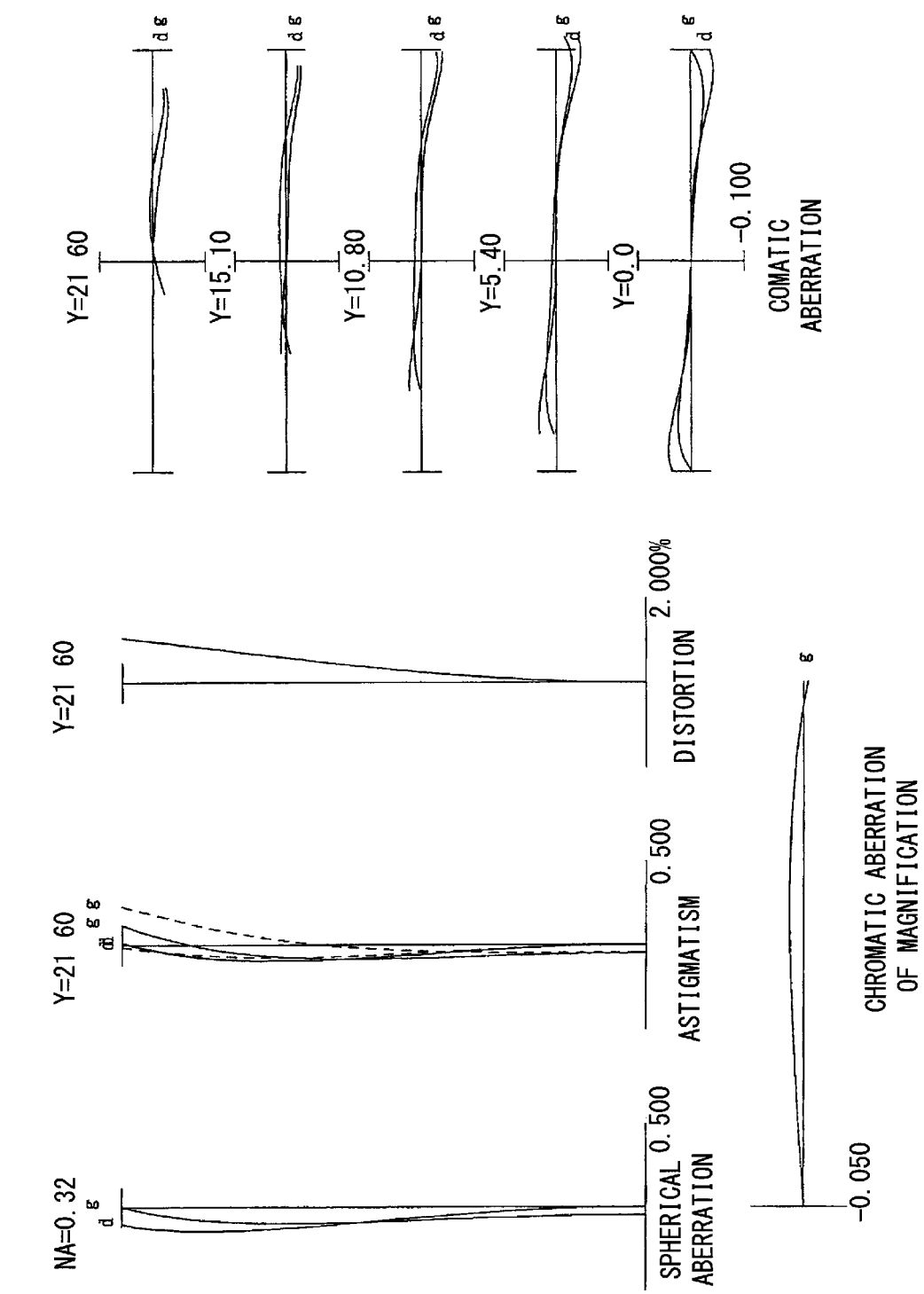
FIG. 6 is a figure showing diagrams of various types of aberration occurring at the optical system in the second example of the present invention in a close-up shooting distance state.

FIG. 5 provides diagrams pertaining to various types of aberration, i.e., spherical aberration, astigmatism, distortion, chromatic aberration of magnification and comatic aberration, occurring at the optical system in the second example in an infinity in-focus state. In addition, FIG. 6 provides diagrams pertaining to the various types of aberration, i.e., spherical aberration, astigmatism, distortion, chromatic aberration of magnification and comatic aberration, occurring in short-distance in-focus state with the photographic magnification factor β set to −0.141. As the various aberration diagrams in FIG. 5 and FIG. 6 clearly indicate, the various types of aberration are well corrected in the optical system achieved in the second example, allowing the optical system to assure a high level of optical performance.

Third Example

Figure 7:
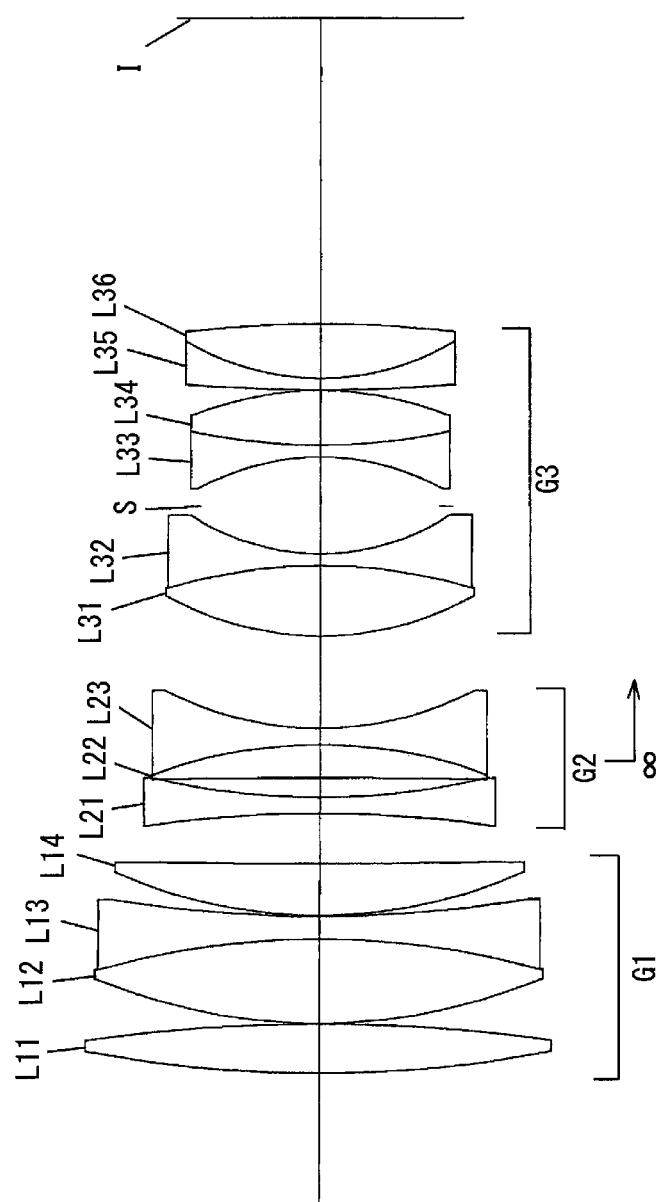
FIG. 7 is a figure showing a sectional view of the lens configuration adopted in an optical system achieved in a third example of the present invention.

FIG. 7 illustrates a lens configuration adopted in an optical system in the third example of the present invention.

The optical system achieved in the example is configured with a first lens group G1 having a positive refractive power, a second lens group G2 having a negative refractive power and a third lens group G3 having a positive refractive power, disposed in this order along the optical axis, starting on the object side.

The first lens group G1 having the positive refractive power is constituted with a bi-convex positive lens L11, a cemented lens formed by bonding together a bi-convex positive lens L12 and a bi-concave negative lens L13, and a positive meniscus lens L14 with its convex surface facing the object side disposed in this order starting on the object side.

The second lens group G2 having the negative refractive power is constituted of a bi-concave negative lens L21, and a cemented lens achieved by bonding together a positive meniscus lens L22 with its concave surface facing the object side and a bi-concave negative lens L23 disposed in this order starting on the object side.

The third lens group G3 having the positive refractive power is made up with cemented lens a formed by bonding together a bi-convex positive lens L31 and a bi-concave negative lens L32, an aperture stop S, a cemented lens formed by bonding together a bi-concave negative lens L33 and a bi-convex positive lens L34, and a cemented lens formed by bonding together a negative meniscus lens L35 with its convex surface facing the object side and a bi-convex positive lens L36 disposed in this order starting on the object side.

The surface (surface number 22) in the third lens group G3, located closest to the image side, is an aspherical surface in the optical system achieved in the example.

In the optical system achieved in the example, the first lens group G1 and the third lens group G3 are fixed relative to the image surface, and the entire second lens group G2 moves toward the image side along the optical axis upon focusing from an infinity-distance object to a short-distance object.

In the optical system achieved in the example, image blurring can be corrected as the cemented lens constituted with the negative lens L33 and the positive lens L34, which is disposed next to the aperture stop S on the image side of the aperture stop S, moves as a vibration-proofing lens group in a direction having a component perpendicular to the optical axis.

The optical system achieved in the example comprises an anti-reflection film formed so as to comprise at least one layer formed through a wet process, disposed at a lens surface (surface number 20) closest to the object side in the cemented lens, which is constituted with the negative lens L35 and the positive lens L36 and is located closest to the image side.

Table 3 below lists data values pertaining to the optical system achieved in the third example.

TABLE 3

[Overall Specification]

f = 102.618
FNO = 1.440
2ω = 23.596
Y = 21.60
TL = 164.819
Bf = 47.774

[Surface Data]

| Surface Number | r | d | nd | vd |
|---|---|---|---|---|
| Object Surface | ∞ | ∞ | | |
| 1 | 198.29690 | 7.671 | 1.59349 | 67.00 |
| 2 | −268.67610 | 0.100 | | |
| 3 | 91.70170 | 13.288 | 1.49782 | 82.57 |
| 4 | −128.83920 | 3.500 | 1.64769 | 33.72 |
| 5 | 203.55460 | 0.100 | | |
| 6 | 79.79810 | 8.164 | 1.49782 | 82.57 |
| 7 | 1937.33200 | variable | | |
| 8 | −194.71540 | 2.500 | 1.71999 | 50.27 |
| 9 | 117.67630 | 3.032 | | |
| 10 | −1433.39560 | 5.200 | 1.80809 | 22.74 |
| 11 | −76.31750 | 2.500 | 1.51742 | 52.20 |
| 12 | 53.75550 | variable | | |
| 13 | 49.94100 | 11.096 | 1.88462 | 36.82 |
| 14 | −83.51650 | 1.800 | 1.63199 | 34.05 |
| 15 | 37.73780 | 7.500 | | |
| 16(aperture S) | ∞ | 7.600 | | |
| 17 | −40.81280 | 1.800 | 1.69044 | 27.44 |
| 18 | 99.54650 | 8.500 | 1.72916 | 54.61 |
| 19 | −55.04360 | 0.100 | | |
| 20 | 285.10750 | 1.800 | 1.55390 | 42.19 |
| 21 | 41.90420 | 8.500 | 1.80733 | 43.13 |
| 22* | −158.99830 | BF | | |
| Image surface | ∞ | | | |

[Lens Group Focus length]

| Group | Starting Surface | Focal Length |
|---|---|---|
| 1 | 1 | 83.797 |
| 2 | 8 | −59.773 |
| 3 | 11 | 69.892 |

[Aspherical Surface Data]

| | κ | A4 | A6 | A8 | A10 |
|---|---|---|---|---|---|
| No. 22 surface | 1 | 9.463E−07 | 3.760E−10 | −7.363E−13 | 1.038E−15 |

[Variable Distance Data]

| | Infinite | Close-up |
|---|---|---|
| f or β | 102.643 | −0.144x |
| D7 | 7.857 | 17.857 |
| D12 | 14.437 | 4.437 |

[Values Corresponding to Conditional Expressions]

(1) f/(−f2) = 1.72
(2) f/f1 = 1.22
(3) f1/(−f2) = 1.40
(4) f1/f3 = 1.20
(5) (−f2)/f3 = 0.86
(6) TL/f1 = 1.97
(7) TL/(−f2) = 2.76
(8) vP = 77.38

As indicated above, the optical system achieved in the third implementation example satisfies all the conditions expressed in conditional expressions (1) through (8).

Figure 8:
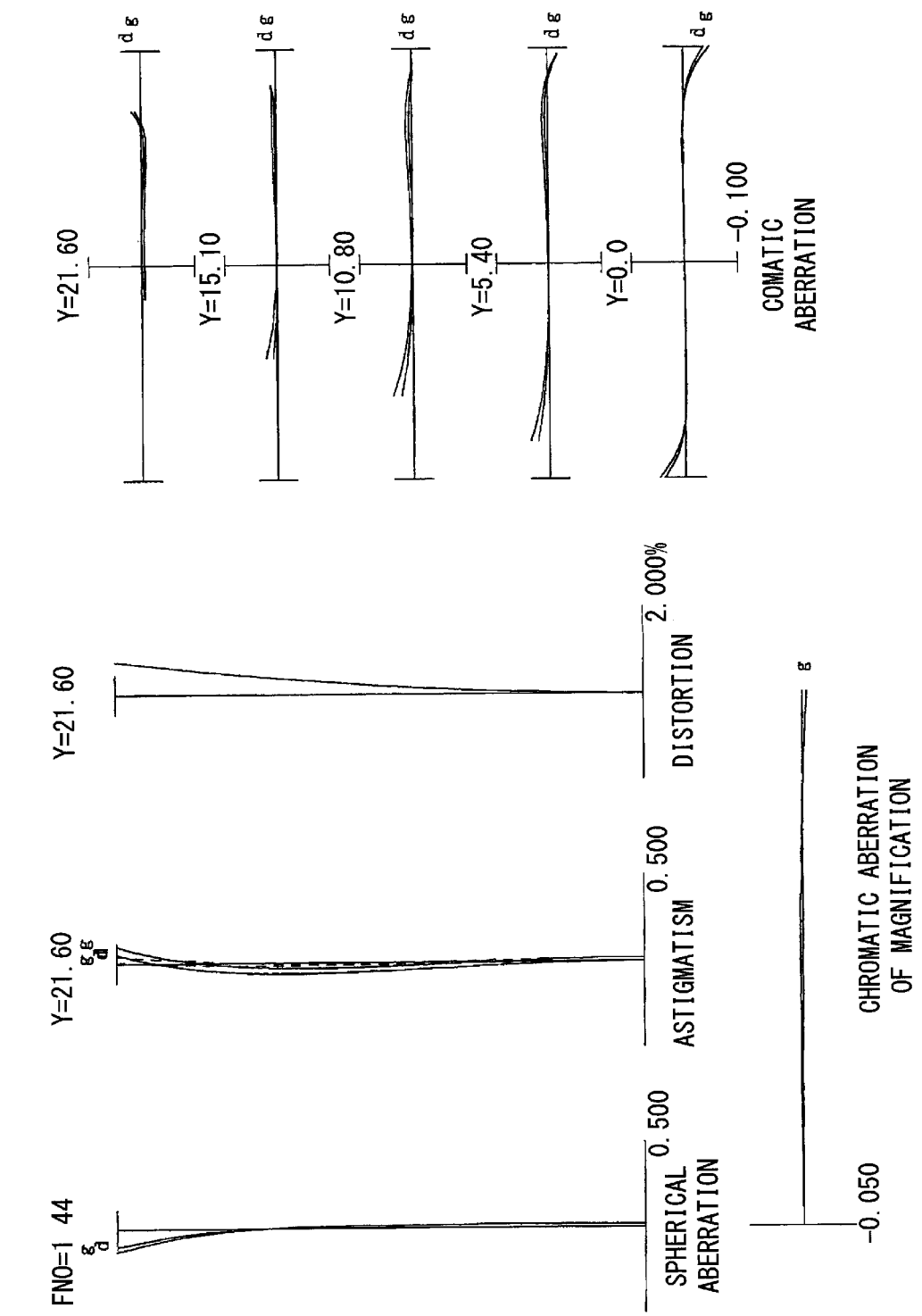
FIG. 8 is a figure showing diagrams of various types of aberration occurring at the optical system in the third example of the present invention in an infinity in-focus state.
Figure 9:
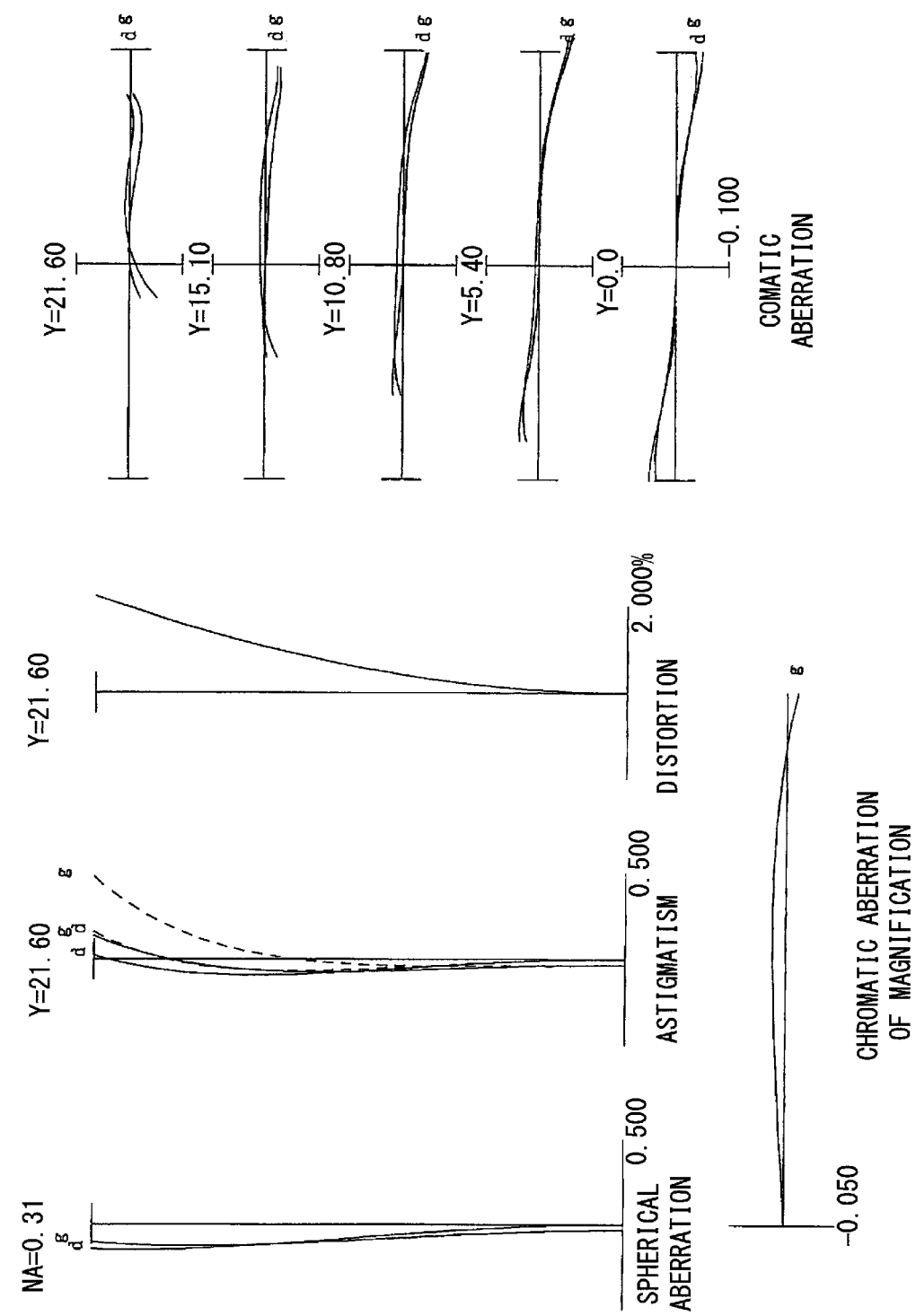
FIG. 9 is a figure showing diagrams of various types of aberration occurring at the optical system in the third example of the present invention in a close-up shooting distance state.

FIG. 8 provides diagrams pertaining to various types of aberration, i.e., spherical aberration, astigmatism, distortion, chromatic aberration of magnification and comatic aberration, occurring at the optical system in the third example in an infinity in-focus state. In addition, FIG. 9 provides diagrams pertaining to the various types of aberration, i.e., spherical aberration, astigmatism, distortion, chromatic aberration of magnification and comatic aberration, occurring in a short-distance in-focus state with the photographic magnification factor β set to −0.144. As the various aberration diagrams in FIG. 8 and FIG. 9 clearly indicate, the various types of aberration are well corrected in the optical system achieved in the third example, allowing the optical system to assure a high level of optical performance.

Table 4 below lists, for reference purposes, specific values taken in the conditional expressions in correspondence to the various examples, i.e., the first through third examples, described above.

TABLE 4

| Conditional Expression | First Example | Second Example | Third Example |
|---|---|---|---|
| (1) f/(−f2) | 1.47 | 1.38 | 1.72 |
| (2) f/f1 | 1.26 | 1.17 | 1.22 |
| (3) f1/(−f2) | 1.17 | 1.18 | 1.40 |
| (4) f1/f3 | 1.12 | 1.21 | 1.20 |
| (5) (−f2)/f3 | 0.96 | 1.02 | 0.86 |
| (6) TL/f1 | 1.81 | 1.79 | 1.97 |
| (7) TL/(−f2) | 2.12 | 2.11 | 2.76 |
| (8) vP | 77.38 | 77.38 | 77.38 |

Figure 13:
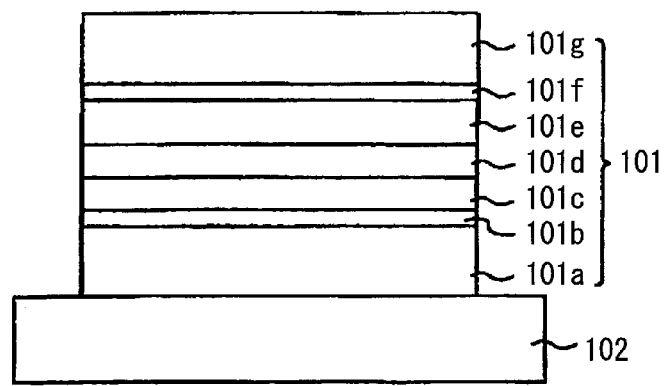
FIG. 13 is a figure showing an illustration providing an example of a layer structure that may be adopted in an anti-reflection film.

The anti-reflection film (may otherwise be referred to as a multilayer broadband anti-reflection film) used in the optical systems achieved in an embodiment of the present invention will be explained next. FIG. 13 presents an example of a film structure that may be adopted in the anti-reflection film. This anti-reflection film 101, constituted with seven layers, is formed at an optical surface of an optical member 102 such as a lens. A first layer 101a is constituted of aluminum oxide vapor-deposited through vacuum deposition. On top of the first layer 101a, a second layer 101b, constituted of a blend of titanium oxide and zirconium oxide, is formed through a vacuum deposition method. On top of the second layer 101b, a third layer 101c constituted of aluminum oxide vapor-deposited through vacuum deposition is formed, and a fourth layer 101d, constituted of a blend of titanium oxide and zirconium oxide, is formed on top of the third layer 101c through a vacuum deposition method. On top of the fourth layer 101d, a fifth layer 101e constituted of aluminum oxide vapor-deposited through vacuum deposition is formed, and a sixth layer 101f, constituted of a blend of titanium oxide and zirconium oxide, is formed on the fifth layer 101e through vacuum deposition.

On top of the sixth layer 101f formed as described above, a seventh layer 101g constituted of a blend of magnesium fluoride and silica is formed through a wet process and thus, formation of the anti-reflection film 101 in the embodiment is completed. The seventh layer 101g is formed through a type of wet process known as the sol-gel method. Through the sol-gel method, a sol prepared by mixing together specific ingredients is rendered into a gel with no fluidity through, for instance, hydrolysis or a poly-condensation reaction and a product is obtained by heating/breaking down this gel. In the sol-gel method adopted in formation of an optical thin film, an optical surface of an optical member is coated with an optical thin-film material sol and a film is formed by drying and thus solidifying the optical thin-film material sol so as to render it into a gel film. It is to be noted that a wet process other than the sol-gel method may be adopted and a solid film may be formed directly without gelling materials.

As described above, the first layer 101a through the sixth player 101f in the anti-reflection film 101 are formed through an electron beam deposition method, which is a dry process, whereas the seventh layer 101g, i.e., the uppermost layer, is formed through a wet process in a procedure to be described next by using a sol liquid prepared through a hydrofluoric acid/magnesium acetate method. First, using a vacuum vapor-deposition apparatus, an aluminum oxide layer, a titanium oxide-zirconium oxide blend layer, an aluminum oxide layer, a titanium oxide-zirconium oxide blend layer, an aluminum oxide layer and a titanium oxide-zirconium oxide blend layer are formed in sequence respectively as the first layer 101a, the second layer 101b, the third layer 101c, the fourth layer 101d, the fifth layer 101e and the sixth layer 101f at a lens film formation surface (the optical surface of the optical member 102 mentioned earlier). Then, the optical member 102 is taken out of the deposition apparatus, and a layer constituted of a blend of magnesium fluoride and silica is formed as the seventh layer 101g by applying, through a spin-coating method, a sol liquid prepared through the hydrofluoric acid/magnesium acetate method and mixed with silicone alkoxide. The sol liquid is prepared through the hydrofluoric acid/magnesium acetate method as indicated in the following reaction formula (b).

$$2HF + Mg(CH_3COO)_2 \rightarrow MgF_2 + 2CH_3COOH \quad (b)$$

The sol liquid is used for the film formation after the materials are mixed and the mixture undergoes a high-temperature, pressure-aging treatment at 140° C. over a 24-hour period in an autoclave. Once the formation of the seventh layer 101g is completed, the optical member 102 undergoes a heat treatment at 160° C. for an hour in open air. Through the sol-gel method described above, the seventh layer 101g is formed as particles with their sizes in a range of several nm to several tens of nm deposited with unfilled space (gaps) in between them.

The optical performance of optical members having the anti-reflection film 101 formed as described above will be described in reference to the spectral characteristics thereof indicated in FIG. 14.

Optical members (lenses) having the anti-reflection film achieved in the embodiment may be formed under the conditions indicated in the following Table 5. Table 5 lists optical film thicknesses of the individual layers 101a (first layer) through 101g (seventh layer) in the anti-reflection film 101 in correspondence to various refractive indices 1.62, 1.74 and 1.85 taken for the substrate (optical member) relative to the reference wavelength λ. It is to be noted that in Table 5, aluminum oxide is notated as Al2O3, a titanium oxide-zirconium oxide blend is notated as ZrO2+TiO2 and a magnesium fluoride-silica blend is notated as MgF2+SiO2.

TABLE 5

| | Substance | Refractive Index | Optical Film thickness | Optical Film thickness | Optical Film thickness |
|---|---|---|---|---|---|
| Medium | Air | 1 | | | |
| 7th layer | MgF2 + SiO2 | 1.26 | 0.268λ | 0.271λ | 0.269λ |
| 6th layer | ZrO2 + TiO2 | 2.12 | 0.057λ | 0.054λ | 0.059λ |
| 5th layer | Al2O3 | 1.65 | 0.171λ | 0.178λ | 0.162λ |
| 4th layer | ZrO2 + TiO2 | 2.12 | 0.127λ | 0.13λ | 0.158λ |
| 3rd layer | Al2O3 | 1.65 | 0.122λ | 0.107λ | 0.08λ |
| 2nd layer | ZrO2 + TiO2 | 2.12 | 0.059λ | 0.075λ | 0.105λ |
| 1st layer | Al2O3 | 1.65 | 0.257λ | 0.03λ | 0.03λ |
| Substrate | Refractive Index | | 1.62 | 1.74 | 1.85 |

Figure 14:
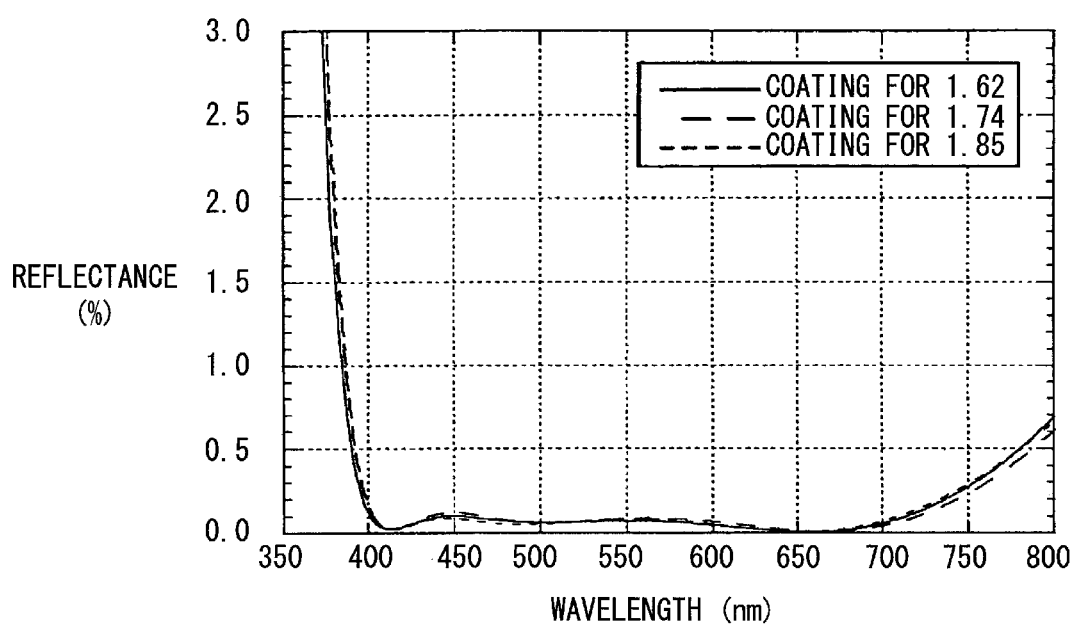
FIG. 14 is a figure showing a graph indicating spectral characteristics of anti-reflection films.

FIG. 14 indicates the spectral characteristics observed as light enters at a right angle at the optical members with various layers in the anti-reflection film 101 thereat designed to take on the corresponding optical film thicknesses as indicated in Table 5 with the reference wavelength λ is 550 nm.

FIG. 14 indicates that the reflectance can be kept at or below 0.2% over a full light wavelength range of 420 nm through 720 nm at each optical member with the anti-reflection film 101 designed with the reference wavelength λ at 550 nm. In addition, even at an optical member with an anti-reflection film 101 with the individual optical film thicknesses determined in correspondence to the reference wavelength λ in Table 5 set at the d-line (wavelength 587.6 nm), the spectral characteristics are hardly affected. In other words, even at such an optical member, spectral characteristics substantially matching the spectral characteristics in FIG. 14 demonstrated at the optical members designed in correspondence to the reference wavelength λ at 550 nm, are achieved.

Next, a variation of the anti-reflection film will be described. The anti-reflection film in this variation is made up with five layers, with the optical film thicknesses of the various layers determined in correspondence to the reference wavelength λ under the conditions indicated in the following Table 6, which is similar to Table 5. The fifth layer is formed through the sol-gel method described earlier.

TABLE 6

| | Substance | Refractive Index | Optical Film thickness | Optical Film thickness |
|---|---|---|---|---|
| Medium | Air | 1 | | |
| 5th layer | MgF2 + SiO2 | 1.26 | 0.275λ | 0.269λ |
| 4th layer | ZrO2 + TiO2 | 2.12 | 0.045λ | 0.043λ |
| 3rd layer | Al2O3 | 1.65 | 0.212λ | 0.217λ |
| 2nd layer | ZrO2 + TiO2 | 2.12 | 0.077λ | 0.066λ |
| 1st layer | Al2O3 | 1.65 | 0.288λ | 0.290λ |
| Substrate | Refractive Index | | 1.46 | 1.52 |

Figure 15:
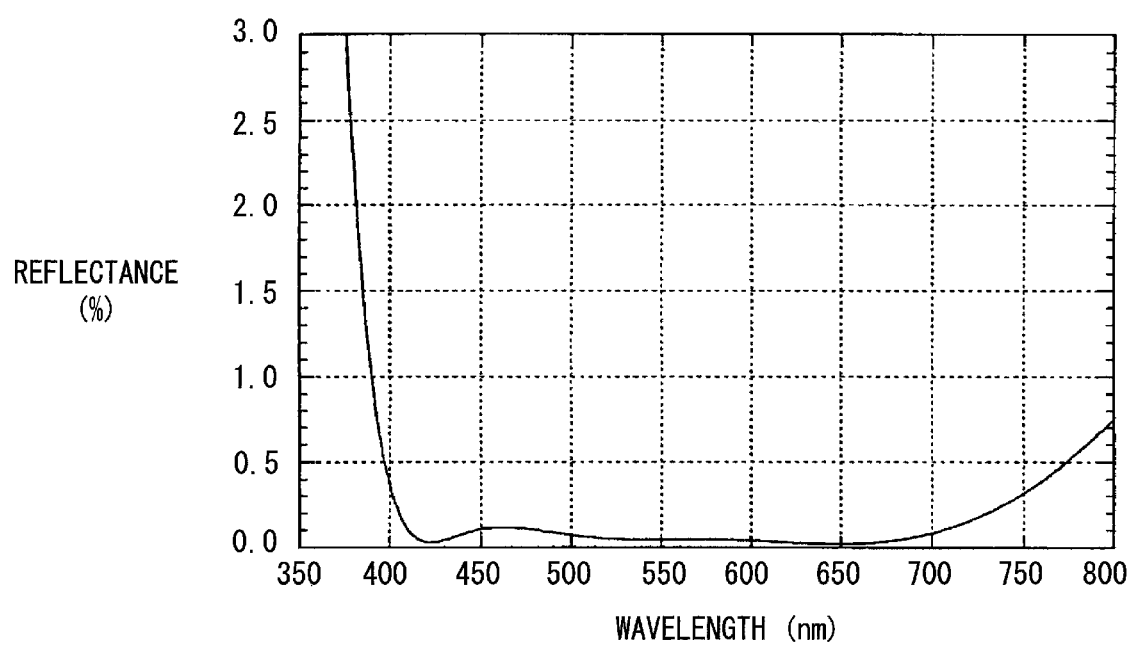
FIG. 15 is a figure showing a graph indicating spectral characteristics of an anti-reflection film achieved in a variation.

FIG. 15 indicates the spectral characteristics observed as light enters at a right angle at an optical member with the anti-reflection film thereat designed to take on the corresponding optical film thicknesses, as indicated in Table 6, with the reference wavelength λ at 550 nm when the refractive index of the substrate is 1.52. FIG. 15 indicates that the reflectance can be kept at or below 0.2% over a full light wavelength range of 420 nm through 720 nm with the anti-reflection film achieved in the variation. In addition, even at an optical member with an anti-reflection film with the individual optical film thicknesses determined in correspondence to the reference wavelength λ in Table 6 set at the d-line (wavelength 587.6 nm), the spectral characteristics are hardly affected. In other words, even at such an optical member, spectral characteristics substantially matching those shown in FIG. 15, are achieved.

Figure 16:
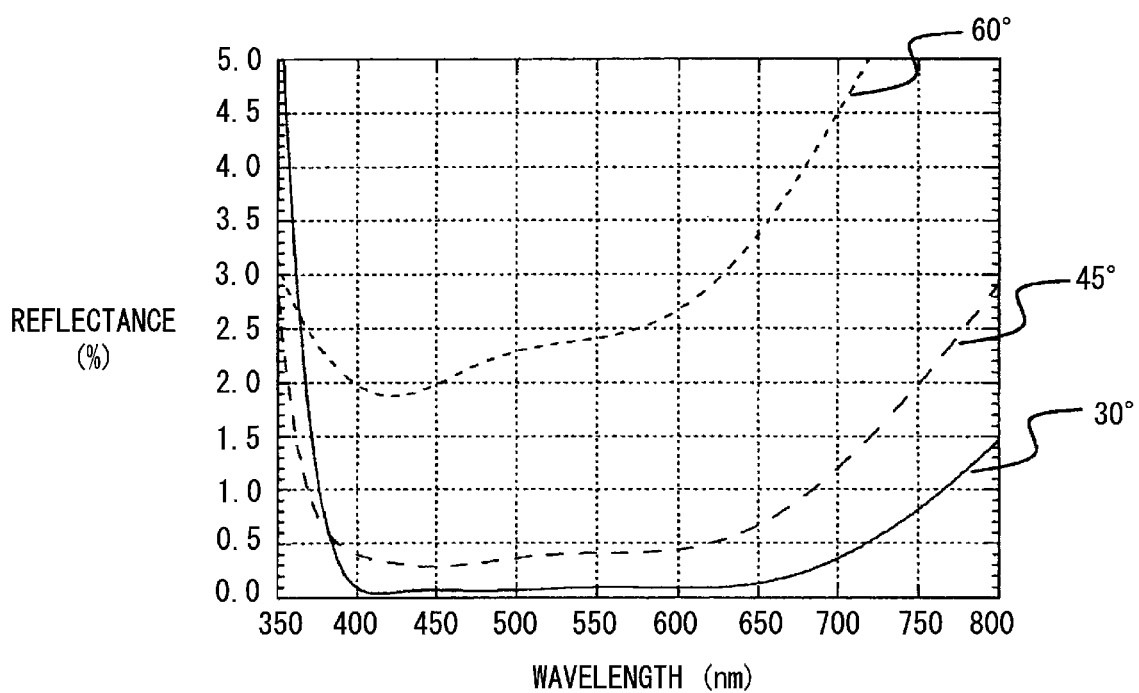
FIG. 16 is a figure showing a graph indicating the entry angle dependency of the spectral characteristics observed at the anti-reflection film achieved in the variation.

FIG. 16 indicates the spectral characteristics observed at the optical member with the spectral characteristics indicated in FIG. 15 when light enters the optical member with entry angles of 30°, 45° and 60°. It is to be noted that while the spectral characteristics of an optical member with the anti-reflection film thereof formed for a substrate with a refractive index of 1.46 in Table 6 are not indicated in FIG. 15 and FIG. 16, such an optical member obviously has spectral characteristics substantially matching those of the optical member with the substrate thereof having a refractive index of 1.52.

Figure 17:
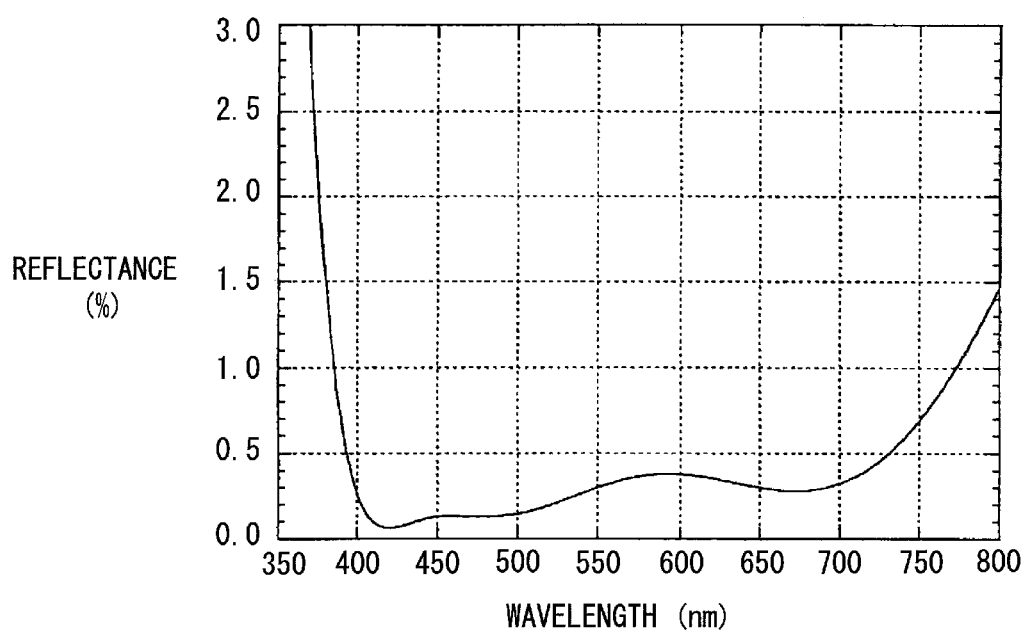
FIG. 17 is a figure showing a graph indicating spectral characteristics of an anti-reflection film manufactured by adopting a related art.

In addition, for purposes of comparison, FIG. 17 presents an example of an anti-reflection film formed entirely through a dry process such as the vacuum deposition method in the related art. FIG. 17 indicates the spectral characteristics observed at an optical member with an anti-reflection film thereof designed under the conditions indicated in Table 7 below, with the substrate thereof having a refractive index of 1.52, as in Table 6 when light enters the optical member at a right angle. In addition, FIG. 18 indicates the spectral characteristics observed at the optical member with the spectral characteristics indicated in FIG. 17 when light enters with entry angles of 30°, 45° and 60°.

TABLE 7

| | Substance | Refractive Index | Optical Film thickness |
|---|---|---|---|
| Medium | Air | 1 | |
| 7th layer | MgF2 | 1.39 | 0.243λ |
| 6th layer | ZrO2 + TiO2 | 2.12 | 0.119λ |
| 5th layer | Al2O3 | 1.65 | 0.057λ |
| 4th layer | ZrO2 + TiO2 | 2.12 | 0.220λ |
| 3rd layer | Al2O3 | 1.65 | 0.064λ |
| 2nd layer | ZrO2 + TiO2 | 2.12 | 0.057λ |
| 1st layer | Al2O3 | 1.65 | 0.193λ |
| Substrate Refractive Index | | | 1.52 |

Figure 18:
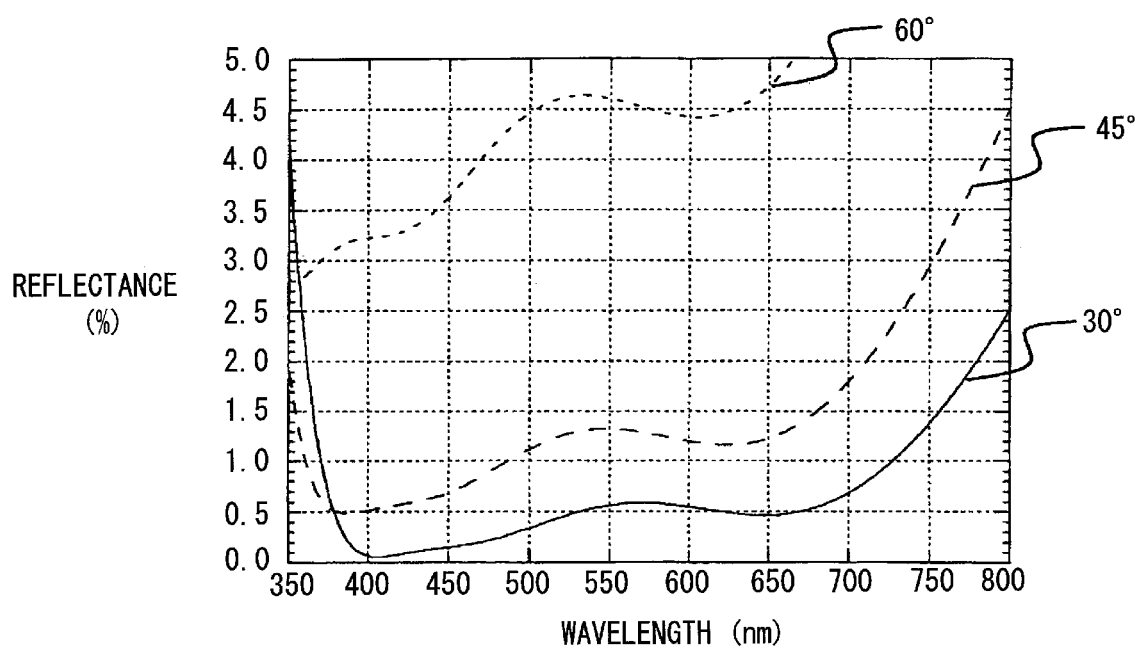
FIG. 18 is a figure showing a graph indicating the entry angle dependency of the spectral characteristics of the anti-reflection film manufactured by adopting the related art.

Comparison of the spectral characteristics of the optical members with the anti-reflection film achieved in the embodiment, indicated in FIG. 14 through FIG. 16, with the spectral characteristics of the optical member in the example of the related art in FIG. 17 and FIG. 18 clearly reveals that lower reflectance is assured via the anti-reflection film in the embodiment at all the entry angles and that low reflectance is assured over a wider range.

Next, examples in which anti-reflection films indicated in Table 5 and Table 6 above are adopted in the first example through the third example of the present invention will be described.

The refractive index of the positive lens L35 in the third lens group G3 in the optical system in the first example of the present invention is nd=1.75596, as indicated in Table 1. Accordingly, by forming an anti-reflection film 101 corresponding to the substrate refractive index of 1.74 (see table 5) at the object-side lens surface of the positive lens L35, the amount of light reflected at the lens surface can be reduced, which, in turn, makes it possible to reduce the extents of ghosting and flare.

In the optical system in the second example of the present invention, the refractive index of the negative lens L36 in the third lens group G3 is nd=1.61532 and the refractive index of the positive lens L37 in the third lens group G3 is nd=1.90265, as indicated in Table 1. Accordingly, by forming an anti-reflection film 101 corresponding to the substrate refractive index of 1.62 (see Table 5) at the image surface side lens surface of the negative lens L36 and forming an anti-reflection film 101 corresponding to the substrate refractive substrate index of 1.85 (see Table 5) at the object side lens surface of the positive lens L37, the amount of light reflected from these lens surfaces can be reduced, which, in turn, makes it possible to reduce the extents of ghosting and flare.

The refractive index of the negative meniscus lens L35 in the third lens group G3 in the optical system achieved in the third example of the present invention is nd=1.55390, as indicated in Table 7. Accordingly, by forming an anti-reflection film corresponding to the substrate refractive index of 1.52 (see Table 6) at the object side lens surface of the negative meniscus lens L35, the amount of light reflected from the lens surface can be reduced, which, in turn, makes it possible to reduce the extents of ghosting and flare.

It is to be noted that the alternatives described below may be adopted as deemed appropriate as long as the optical performance remains intact.

While the optical systems in the examples each adopt a three-group configuration, the present invention may be adopted in another group configuration such as a four-group configuration. In addition, it may be adopted in a configuration with an additional lens or an additional lens group disposed closest to the object or in a configuration with an additional lens or an additional lens group disposed closest to the image side. It is to be noted that the term "lens group" is used to refer to a portion made up with at least one lens, which is separated via an air gap, the size of which changes during focusing operation.

A single lens group, a plurality of lens groups or a partial lens group may be made to move along the optical axis as a focusing lens group upon focusing from an infinity-distance object to a short-distance object. Such a focusing lens group can also be used for autofocusing operation and is optimal for motor drive for autofocus operation (in which an ultrasonic motor or the like is utilized). It is particularly desirable to use the second lens group as the focusing lens group.

While it is desirable to dispose the aperture stop in the third lens group, the function of an aperture stop may be fulfilled via a lens frame without disposing a dedicated aperture stop member.

Image blurring caused by camera shaking may be corrected via a lens group or a partial lens group designated as a vibration-proofing lens group, which is made to move in a direction having a component perpendicular to the optical axis or is made to rotationally move (swing) along the direction in which a plane containing the optical axis ranges. It is particularly desirable to use at least part of the third lens group as the vibration-proofing lens group. It is even more desirable to use a lens component disposed next to the aperture stop on the image side of the aperture stop as the vibration-proofing lens group.

The present invention may be adopted in conjunction with a lens with a spherical lens surface, a planar lens surface or an aspherical lens surface. A spherical or planar lens surface is desirable in that the lens can be machined with ease and facilitates assembly and adjustment, which makes it possible to prevent degradation of optical performance due to error occurring during the machining, assembly and adjustment processes. In addition, it is further desirable in that even in the event of an image surface misalignment, the extent of degradation in imaging performance is limited. An aspherical lens surface may be formed through grinding, or an aspherical surface may be a glass mold aspherical shape constituted of glass formed in an aspherical shape with a mold or a composite aspherical shape constituted of resin disposed at the surface of glass and formed in an aspherical shape. Furthermore, the present invention may be adopted in conjunction with a lens with diffractive surface, or it may be adopted in conjunction with a gradient index lens (GRIN lens) or a plastic lens.

An anti-reflection film achieving a high level of transmittance over a wide wavelength range may be disposed at the individual lens surfaces so as to reduce the extents of flare and ghosting and assure high-contrast optical performance.

Figure 10:
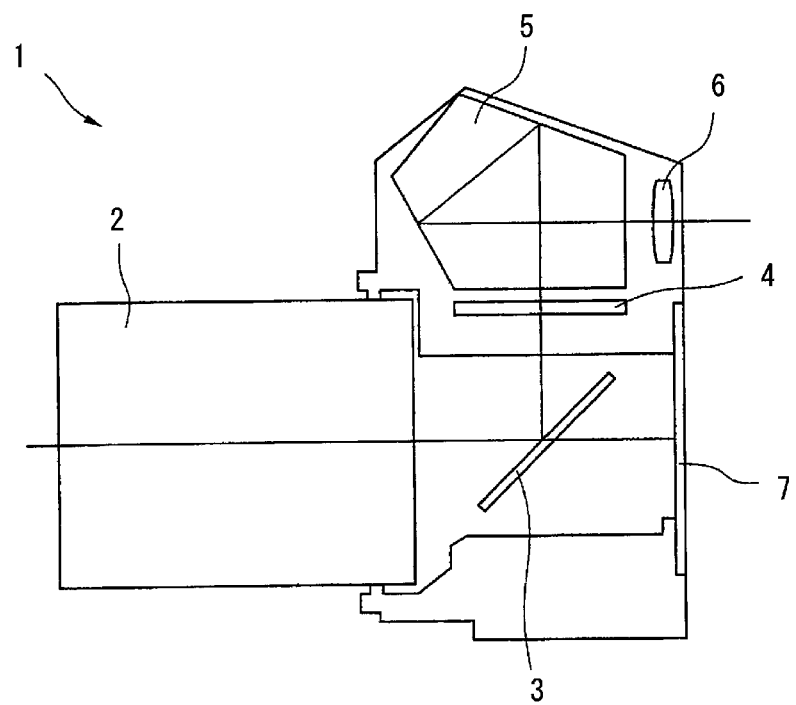
FIG. 10 is a figure showing a sectional view of a single lens reflex camera having the optical system according to the present invention.

FIG. 10 is a schematic sectional view of a single lens reflex camera 1 (hereafter will be simply referred to as a camera), representing an example of an optical device equipped with an optical system described above. In the camera 1, light departing an object (photographic subject) (not shown) is condensed at a photographic lens 2 (optical system) and an image is formed via a quick-return mirror 3 on a reticle 4. The light having formed an image at the reticle 4 is reflected a plurality of times within a pentaprism 5 and is then guided to an eyepiece lens 6. The photographer is thus able to view an object (photographic subject) image as an upright image via the eyepiece lens 6.

In addition, as the photographer presses a shutter release button (not shown), the quick-return mirror 3 retreats to a position outside the optical path, and the light from the object (photographic subject) (not shown), condensed at the photographic lens 2, forms a subject image on an image sensor 7. Thus, an image is captured at the image sensor 7 with the light from the object (subject) and the image thus captured is recorded as an object (photographic subject) image into a memory (not shown). Through this process, the photographer is able to photograph the object (photographic subject) with the camera 1. It is to be noted that the photographic lens 2 in the camera 1 shown in FIG. 10 may be a detachable lens or an integrated part of the camera 1. Furthermore, the camera 1 may be what has been referred to as a single lens reflex camera or it may be a compact camera that does not include a quick-return mirror and the like or a mirrorless single lens reflex camera.

The optical system mounted in the camera 1 as the photographic lens 2 thereof reduces the extents of ghosting and flare and limits the extent of aberration fluctuation occurring during image blurring correction thanks to its characteristic lens configuration. In other words, the camera 1 allows photographing operation to be performed with the extents of ghosting and flare further reduced while effectively limiting the extent of aberration fluctuation, which tends to occur during image blurring correction.

Figure 11:
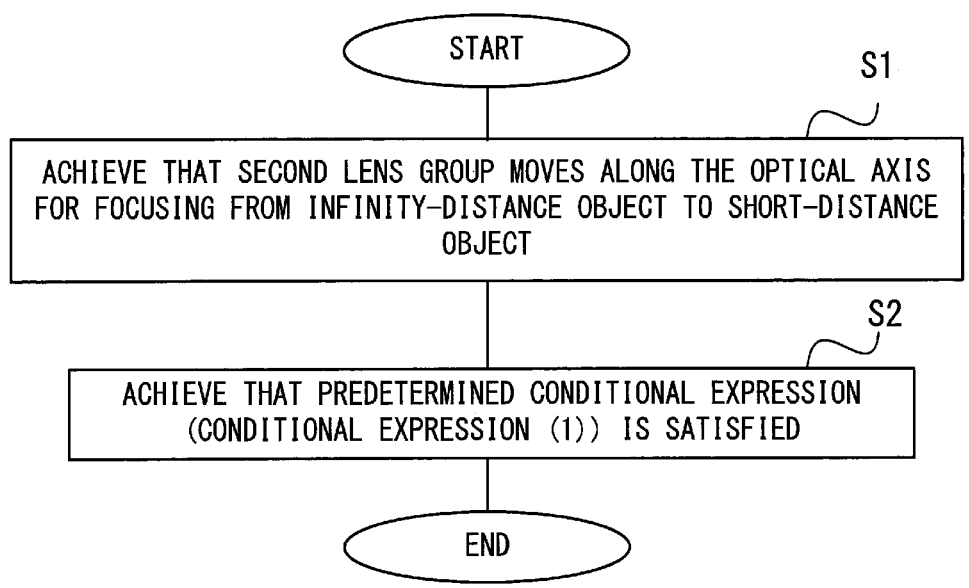
FIG. 11 is a figure showing a flowchart in reference to which a method for manufacturing the optical system according to the present invention is to be explained.

Next, in reference to FIG. 11, an optical system manufacturing method for manufacturing an optical system achieved in an embodiment will be briefly explained. The optical system manufacturing method through which an optical system comprising a first lens group having a positive refractive power, a second lens group having a negative refractive power and a third lens group having a positive refractive power, disposed in this order along the optical axis starting on the object side, is manufactured, includes the following steps S1 and S2.

A step of achieving that the second lens group moves along the optical axis upon focusing from an infinity-distance object to a short-distance object (step S1)

A step of achieving that predetermined conditional expression (1) below is satisfied (step S2);

$$1.00<f/(-f2)<2.40 \qquad (1)$$

where:
f: a focal length of the optical system in an infinity in-focus state; and
f2: a focal length of the second lens group.

Through the manufacturing method described above, an optical system assuring outstanding optical performance over a wide range from an infinity-distance object point to a short-distance object point can be manufactured.

Figure 12:
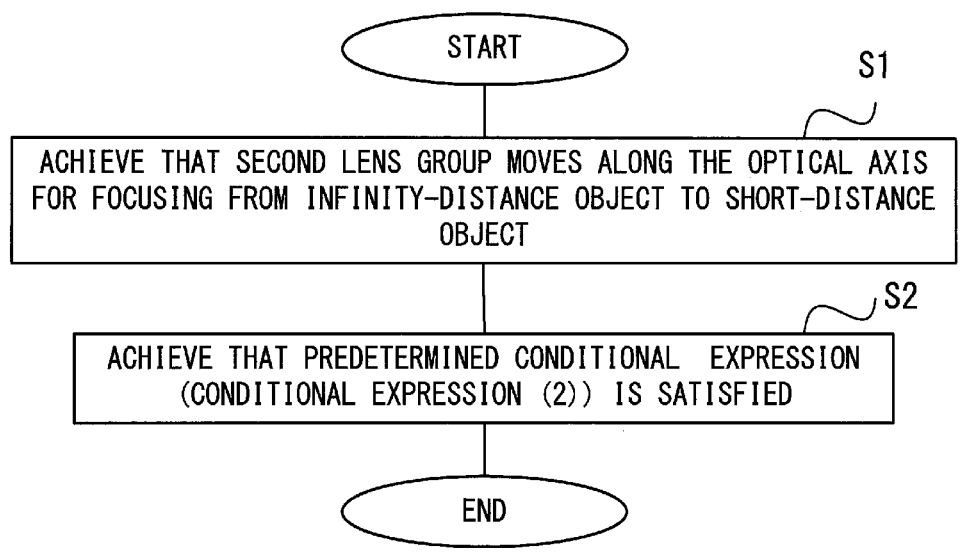
FIG. 12 is a figure showing a flowchart in reference to which another method for manufacturing the optical system according to the present invention is to be explained.

Next, in reference to FIG. 12, another optical system manufacturing method for manufacturing an optical system achieved in the embodiment will be briefly explained. The optical system manufacturing method through which an optical system comprising a first lens group having a positive refractive power, a second lens group having a negative refractive power and a third lens group having a positive refractive power, disposed in this order along the optical axis starting on the object side, is manufactured, includes the following steps S1 and S2.

A step of achieving that the second lens group moves along the optical axis upon focusing from an infinity-distance object to a short-distance object (step S1)

A step of achieving that predetermined conditional expression (2) below is satisfied (step S2);

$$0.80<f/f1<1.60 \qquad (2)$$

where:
f: a focal length of the optical system in an infinity in-focus state
f1: a focal length of the first lens group.

Through the manufacturing method described above, an optical system assuring outstanding optical performance over a wide range from an infinity-distance object point to a short-distance object point can be manufactured.

The disclosure of the following priority application is herein incorporated by reference:

Japanese Patent Application No. 2015-011654 (filed on Jan. 23, 2015)

REFERENCE SIGNS LIST

G1 first lens group
G2 second lens group
G3 third lens group
S aperture stop
I image surface
1 single lens reflex camera
2 photographic lens
3 quick-return mirror
4 reticle
5 pentaprism
6 eyepiece lens
7 image sensor

The invention claimed is:

1. An optical system comprising, disposed in sequence starting on an object side along an optical axis:
   a first lens group having a positive refractive power;
   a second lens group having a negative refractive power; and
   a third lens group having a positive refractive power,
   wherein:
   the second lens group moves along the optical axis upon focusing from an infinity-distance object to a short-distance object;
   an aperture stop is located on an image side of the second lens group; and
   the following conditional expressions are satisfied:

$$1.30<f/(-f2)\leq1.72$$

$$0.70<(-f2)/f3<1.50$$

$$1.50<TL/(-f2)<3.10$$

where:
- f: a focal length of the optical system in an infinity in-focus state;
- f2: a focal length of the second lens group;
- f3: a focal length of the third lens group; and
- TL: a total length of the optical system.

2. The optical system according to claim 1, wherein: the following conditional expression is satisfied:

$$0.80 < f/f1 < 1.60$$

where:
- f1: a focal length of the first lens group.

3. The optical system according to claim 1, wherein: the following conditional expression is satisfied:

$$0.80 < f1/(-f2) < 1.45$$

where:
- f1: a focal length of the first lens group.

4. The optical system according to claim 1, wherein: the following conditional expression is satisfied:

$$1.11 < f1/f3 < 1.50$$

where:
- f1: a focal length of the first lens group; and
- f3: a focal length of the third lens group.

5. The optical system according to claim 1, wherein: the following conditional expression is satisfied:

$$1.20 < TL/f1 < 2.05$$

where:
- TL: a total length of the optical system; and
- f1: a focal length of the first lens group.

6. The optical system according to claim 1, wherein: the following conditional expression is satisfied:

$$63.00 < vp \leq 77.38$$

where:
- vp: an average value of Abbe numbers of all positive lenses included in the first lens group.

7. The optical system according to claim 1, wherein: the first lens group remains fixed upon focusing from the infinity-distance object to the short-distance object.

8. The optical system according to claim 1, wherein: the third lens group remains fixed upon focusing from the infinity-distance object to the short-distance object.

9. The optical system according to claim 1, wherein: the first lens group comprises a cemented lens; and the cemented lens comprises a positive lens and a negative lens disposed in sequence starting on the object side.

10. The optical system according to claim 1, wherein: the third lens group comprises the aperture stop.

11. The optical system according to claim 1, wherein: a lens surface present next to the aperture stop on the object side thereof is a lens surface with a convex shape having convexity toward the object side; and a lens surface present next to the aperture stop on an image side thereof is a lens surface with a convex shape having convexity toward the image side.

12. The optical system according to claim 1, wherein: the third lens group comprises a positive lens at an end closest to the object side and a negative lens next to the positive lens.

13. The optical system according to claim 1, wherein: the second lens group comprises a cemented lens; the cemented lens comprises a positive lens and a negative lens disposed in sequence starting on the object side; and the second lens group is made up with the cemented lens or is made up with a negative lens and the cemented lens disposed in sequence starting on the object side.

14. The optical system according to claim 1, wherein: the third lens group comprises at least one aspherical surface.

15. The optical system according to claim 1, wherein: at least part of the third lens group moves in a direction having a component perpendicular to the optical axis.

16. The optical system according to claim 1, wherein: an anti-reflection film is disposed at at least one surface among optical surfaces in the first lens group through the third lens group; and the anti-reflection film comprises at least one layer formed through a wet process.

17. The optical system according to claim 16, wherein: nd representing a refractive index of the layer formed through the wet process, at a d-line (wavelength $\Lambda$=587.6 nm), is equal to or less than 1.30.

18. An optical device comprising the optical system according to claim 1.

19. An optical system comprising, disposed in sequence starting on an object side along an optical axis:
- a first lens group having a positive refractive power;
- a second lens group having a negative refractive power; and
- a third lens group having a positive refractive power, wherein:
- the second lens group moves along the optical axis upon focusing from an infinity-distance object to a short-distance object;
- an aperture stop is located on an image side of the second lens group; and
- the following conditional expressions are satisfied:

$$0.80 < f/f1 \leq 1.26$$

$$1.11 < f1/f3 < 1.30$$

$$1.40 < TL/f1 < 2.03$$

where:
- f: a focal length of the optical system in an infinity in-focus state;
- f1: a focal length of the first lens group;
- f3: a focal length of the third lens group; and
- TL: a total length of the optical system.

20. The optical system according to claim 19, wherein: the following conditional expression is satisfied:

$$0.80 < f1/(-f2) < 1.45$$

where:
- f2: a focal length of the second lens group.

21. The optical system according to claim 19, wherein: the following conditional expression is satisfied:

$$0.70 < (-f2)/f3 < 1.50$$

where:
- f2: a focal length of the second lens group; and
- f3: a focal length of the third lens group.

22. The optical system according to claim 19, wherein: the following conditional expression is satisfied:

$$1.50 < TL/(-f2) < 3.10$$

where:
- TL: a total length of the optical system; and
- f2: a focal length of the second lens group.

23. The optical system according to claim 19, wherein:
the following conditional expression is satisfied:

$$63.00 < vp \leq 77.38$$

where:
vp: an average value of Abbe numbers of all positive lenses included in the first lens group.

24. The optical system according to claim 19, wherein: the first lens group remains fixed upon focusing from the infinity-distance object to the short-distance object.

25. The optical system according to claim 19, wherein: the third lens group remains fixed upon focusing from the infinity-distance object to the short-distance object.

26. The optical system according to claim 19, wherein:
the first lens group comprises a cemented lens; and
the cemented lens comprises a positive lens and a negative lens disposed in sequence starting on the object side.

27. The optical system according to claim 19, wherein: the third lens group comprises the aperture stop.

28. The optical system according to claim 19, wherein:
a lens surface present next to the aperture stop on the object side thereof is a lens surface with a convex shape having convexity toward the object side; and
a lens surface present next to the aperture stop on an image side thereof is a lens surface with a convex shape having convexity toward the image side.

29. The optical system according to claim 19, wherein:
the third lens group comprises a positive lens at an end closest to the object side and a negative lens next to the positive lens.

30. The optical system according to claim 19, wherein:
the second lens group comprises a cemented lens;
the cemented lens comprises a positive lens and a negative lens disposed in sequence starting on the object side; and
the second lens group is made up with the cemented lens or is made up with a negative lens and the cemented lens disposed in sequence starting on the object side.

31. The optical system according to claim 19, wherein: the third lens group comprises at least one aspherical surface.

32. The optical system according to claim 19, wherein: at least part of the third lens group moves in a direction having a component perpendicular to the optical axis.

33. The optical system according to claim 19, wherein:
an anti-reflection film is disposed at at least one surface among optical surfaces in the first lens group through the third lens group; and
the anti-reflection film comprises at least one layer formed through a wet process.

34. The optical system according to claim 33, wherein:
nd representing a refractive index of the layer formed through the wet process, at a d-line (wavelength λ=587.6 nm), is equal to or less than 1.30.

35. An optical device comprising the optical system according to claim 19.

36. A method for manufacturing an optical system, comprising:
disposing a first lens group having a positive refractive power, a second lens group having a negative refractive power and a third lens group having a positive refractive power in sequence along an optical axis starting on an object side;
arranging the second lens group to move along the optical axis upon focusing from an infinity-distance object to a short-distance object; and
disposing an aperture stop on an image side of the second lens group,
the method further comprising at least one of the following features (A) or (B):
(A) satisfying the following conditional expressions:

$$1.30 < f/(-f2) \leq 1.72$$

$$0.70 < (-f2)/f3 < 1.50$$

$$1.50 < TL/(-f2) < 3.10$$

where:
f: a focal length of the optical system in an infinity in-focus state,
f2: a focal length of the second lens group,
f3: a focal length of the third lens group, and
TL: a total length of the optical system,
(B) satisfying the following conditional expressions:

$$0.80 < f/f1 \leq 1.26$$

$$1.11 < f1/f3 < 1.30$$

$$1.40 < TL/f1 < 2.03$$

where:
f: a focal length of the optical system in an infinity in-focus state;
f1: a focal length of the first lens group;
f3: a focal length of the third lens group; and
TL: a total length of the optical system.

* * * * *